US009357071B2

United States Patent
Conway et al.

(10) Patent No.: US 9,357,071 B2
(45) Date of Patent: *May 31, 2016

(54) METHOD AND SYSTEM FOR ANALYZING A COMMUNICATION BY APPLYING A BEHAVIORAL MODEL THERETO

(71) Applicant: Mattersight Corporation, Chicago, IL (US)

(72) Inventors: Kelly Conway, Lake Bluff, IL (US); Keene Hedges Capers, La Jolla, CA (US); Christopher Danson, Austin, TX (US); Douglas Brown, Austin, TX (US); David Gustafson, Lake Bluff, IL (US); Roger Warford, Hoschton, GA (US); Melissa Moore, Chicago, IL (US)

(73) Assignee: Mattersight Corporation, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/308,555

(22) Filed: Jun. 18, 2014

(65) Prior Publication Data

US 2014/0301541 A1 Oct. 9, 2014

Related U.S. Application Data

(63) Continuation of application No. 14/072,479, filed on Nov. 5, 2013, now Pat. No. 8,781,102, which is a continuation of application No. 13/165,149, filed on Jun. 21, 2011, now Pat. No. 8,594,285, which is a continuation of application No. 11/131,850, filed on May 18, 2005, now Pat. No. 7,995,717.

(51) Int. Cl.
*H04M 11/00* (2006.01)
*H04M 3/00* (2006.01)
(Continued)

(52) U.S. Cl.
CPC ......... *H04M 3/5175* (2013.01); *G10L 15/1822* (2013.01); *G10L 15/26* (2013.01); *H04M 3/42221* (2013.01); *H04M 2201/40* (2013.01)

(58) Field of Classification Search
CPC .......... H04M 3/5175; H04M 3/42221; H04M 3/5166; H04M 3/493; H04M 3/533; H04M 3/4936
USPC ........... 379/88.16, 26.02, 67.15, 265.07, 67.1
See application file for complete search history.

(56) References Cited

U.S. PATENT DOCUMENTS 3,851,121 A 11/1974 Marvin
3,855,416 A 12/1974 Fuller
(Continued)

FOREIGN PATENT DOCUMENTS

EP 0862304 A2 9/1998
EP 0863678 A2 9/1998
(Continued)

OTHER PUBLICATIONS

Abstract of Couretas, John, Automotive news, "Car Dealer Management Software Systems Are Being Re-engineered With Web technology to Allow Greater Communications With Customers," published in the United States, Nov. 1999, vol. 5847, 3 pages.
(Continued)

*Primary Examiner* — Rasha Al Aubaidi
(74) *Attorney, Agent, or Firm* — Haynes and Boone, LLP

(57) ABSTRACT

A method for analyzing a telephonic communication between a customer and a contact center is provided. According to the method, a telephonic communication is separated into at least first constituent voice data and second constituent voice data. One of the first and second constituent voice data is analyzed by mining the voice data and applying a predetermined linguistic-based psychological behavioral model to one of the separated first and second constituent voice data. Behavioral assessment data is generated which corresponds to the analyzed voice data.

26 Claims, 31 Drawing Sheets

(51) Int. Cl.
  *H04M 3/51* (2006.01)
  *G10L 15/18* (2013.01)
  *H04M 3/42* (2006.01)
  *G10L 15/26* (2006.01)

(56) References Cited

U.S. PATENT DOCUMENTS

| | | |
|---|---|---|
| 3,855,418 A | 12/1974 | Fuller |
| 3,971,034 A | 7/1976 | Bell, Jr. et al. |
| 4,093,821 A | 6/1978 | Williamson |
| 4,142,067 A | 2/1979 | Williamson |
| 4,377,158 A | 3/1983 | Friedman et al. |
| 4,490,840 A | 12/1984 | Jones |
| 4,694,483 A | 9/1987 | Cheung |
| 5,148,483 A | 9/1992 | Silverman |
| 5,148,493 A | 9/1992 | Bruney |
| 5,206,903 A | 4/1993 | Kohler et al. |
| 5,239,460 A | 8/1993 | LaRoche |
| 5,299,260 A | 3/1994 | Shaio |
| 5,467,391 A | 11/1995 | Donaghue, Jr. et al. |
| 5,500,795 A | 3/1996 | Powers et al. |
| 5,535,256 A | 7/1996 | Maloney et al. |
| 5,559,875 A | 9/1996 | Bieselin et al. |
| 5,561,707 A | 10/1996 | Katz |
| 5,577,254 A | 11/1996 | Gilbert |
| 5,590,171 A | 12/1996 | Howe et al. |
| 5,590,188 A | 12/1996 | Crockett |
| 5,594,790 A | 1/1997 | Curreri et al. |
| 5,594,791 A | 1/1997 | Szlam et al. |
| 5,621,789 A | 4/1997 | McCalmont et al. |
| 5,633,916 A | 5/1997 | Goldhagen et al. |
| 5,646,981 A | 7/1997 | Klein |
| 5,696,811 A | 12/1997 | Maloney et al. |
| 5,710,884 A | 1/1998 | Dedrick |
| 5,712,954 A | 1/1998 | Dezonno |
| 5,717,742 A | 2/1998 | Hyde-Thomson |
| 5,721,827 A | 2/1998 | Logan et al. |
| 5,724,420 A | 3/1998 | Torgrim |
| 5,732,216 A | 3/1998 | Logan et al. |
| 5,734,890 A | 3/1998 | Case et al. |
| 5,737,405 A | 4/1998 | Dezonno |
| 5,757,904 A | 5/1998 | Anderson |
| 5,764,728 A | 6/1998 | Ala et al. |
| 5,768,513 A | 6/1998 | Kuthyar et al. |
| 5,784,452 A | 7/1998 | Carney |
| 5,790,798 A | 8/1998 | Beckett, II et al. |
| 5,799,063 A | 8/1998 | Krane |
| 5,809,250 A | 9/1998 | Kisor |
| 5,815,551 A | 9/1998 | Katz |
| 5,818,907 A | 10/1998 | Maloney et al. |
| 5,818,909 A | 10/1998 | Van Berkum et al. |
| 5,822,306 A | 10/1998 | Catchpole |
| 5,822,400 A | 10/1998 | Smith |
| 5,822,410 A | 10/1998 | McCausland et al. |
| 5,822,744 A | 10/1998 | Kesel |
| 5,825,869 A | 10/1998 | Brooks et al. |
| 5,828,730 A | 10/1998 | Zebryk et al. |
| 5,841,966 A | 11/1998 | Irribarren |
| 5,845,290 A | 12/1998 | Yoshii |
| 5,848,396 A | 12/1998 | Gerace |
| 5,854,832 A | 12/1998 | Dezonno |
| 5,857,175 A | 1/1999 | Day et al. |
| 5,859,898 A | 1/1999 | Checco |
| 5,864,616 A | 1/1999 | Hartmeier |
| 5,870,549 A | 2/1999 | Bob, II |
| 5,875,436 A | 2/1999 | Kikinis |
| 5,878,384 A | 3/1999 | Johnson et al. |
| 5,884,032 A | 3/1999 | Bateman et al. |
| 5,884,262 A | 3/1999 | Wise et al. |
| 5,894,512 A | 4/1999 | Zenner |
| 5,897,616 A | 4/1999 | Kanevsky et al. |
| 5,903,641 A | 5/1999 | Tonisson |
| 5,910,107 A | 6/1999 | Jiff |
| 5,911,776 A | 6/1999 | Guck |
| 5,914,951 A | 6/1999 | Bentley et al. |
| 5,915,001 A | 6/1999 | Uppaluru |
| 5,915,011 A | 6/1999 | Miloslavsky |
| 5,923,746 A | 7/1999 | Baker |
| 5,926,538 A | 7/1999 | Deryugen et al. |
| 5,930,764 A | 7/1999 | Melchione et al. |
| 5,940,476 A | 8/1999 | Morganstein et al. |
| 5,940,494 A | 8/1999 | Rafacz et al. |
| 5,940,792 A | 8/1999 | Hollier |
| 5,943,416 A | 8/1999 | Gisby |
| 5,945,989 A | 8/1999 | Freishtat |
| 5,946,375 A | 8/1999 | Pattison et al. |
| 5,946,388 A | 8/1999 | Walker et al. |
| 5,951,643 A | 9/1999 | Shelton et al. |
| 5,953,389 A | 9/1999 | Pruett |
| 5,953,406 A | 9/1999 | LaRue et al. |
| 5,964,839 A | 10/1999 | Johnson et al. |
| 5,987,415 A | 11/1999 | Breese et al. |
| 5,991,735 A | 11/1999 | Gerace |
| 6,003,013 A | 12/1999 | Boushy et al. |
| 6,006,188 A | 12/1999 | Bogdashevsky et al. |
| 6,009,163 A | 12/1999 | Nabkel et al. |
| 6,014,647 A | 1/2000 | Nizzari et al. |
| 6,021,428 A | 2/2000 | Miloslavsky |
| 6,026,397 A | 2/2000 | Sheppard |
| 6,029,153 A | 2/2000 | Bauchner et al. |
| 6,058,163 A | 5/2000 | Pattison et al. |
| 6,064,731 A | 5/2000 | Flockhart et al. |
| 6,078,891 A | 6/2000 | Riordan |
| 6,108,711 A | 8/2000 | Beck et al. |
| 6,128,380 A | 10/2000 | Shaffer et al. |
| 6,151,571 A | 11/2000 | Pertrushin |
| 6,173,053 B1 | 1/2001 | Bogart et al. |
| 6,185,534 B1 | 2/2001 | Breese et al. |
| 6,195,426 B1 | 2/2001 | Bolduc et al. |
| 6,205,215 B1 | 3/2001 | Dombakly |
| 6,212,502 B1 | 4/2001 | Ball et al. |
| 6,243,684 B1 | 6/2001 | Stuart et al. |
| 6,275,806 B1 | 8/2001 | Pertrushin |
| 6,286,030 B1 | 9/2001 | Wenig et al. |
| 6,289,094 B1 | 9/2001 | Miloslavsky |
| 6,295,353 B1 | 9/2001 | Flockhart et al. |
| 6,334,110 B1 | 12/2001 | Walter et al. |
| 6,345,094 B1 | 2/2002 | Khan et al. |
| 6,353,810 B1 | 3/2002 | Pertrushin |
| 6,363,145 B1 | 3/2002 | Shaffer et al. |
| 6,363,346 B1 | 3/2002 | Walters |
| 6,366,658 B1 | 4/2002 | Bjornberg et al. |
| 6,366,666 B2 | 4/2002 | Bengtson et al. |
| 6,370,574 B1 | 4/2002 | House et al. |
| 6,389,132 B1 | 5/2002 | Price |
| 6,392,666 B1 | 5/2002 | Hong et al. |
| 6,404,883 B1 | 6/2002 | Hartmeier |
| 6,411,687 B1 | 6/2002 | Bohacek et al. |
| 6,411,708 B1 | 6/2002 | Khan |
| 6,424,709 B1 | 7/2002 | Doyle et al. |
| 6,434,230 B1 | 8/2002 | Gabriel |
| 6,434,231 B2 | 8/2002 | Neyman et al. |
| 6,446,119 B1 | 9/2002 | Olah et al. |
| 6,466,663 B1 | 10/2002 | Ravenscroft et al. |
| 6,480,601 B1 | 11/2002 | McLaughlin |
| 6,480,826 B2 | 11/2002 | Pertrushin |
| 6,490,560 B1 | 12/2002 | Ramaswamy et al. |
| 6,510,220 B1 | 1/2003 | Beckett et al. |
| 6,535,601 B1 | 3/2003 | Flockhart et al. |
| 6,542,156 B1 | 4/2003 | Hong et al. |
| 6,542,602 B1 | 4/2003 | Elazar |
| 6,553,112 B2 | 4/2003 | Ishikawa |
| 6,556,976 B1 | 4/2003 | Callen |
| 6,567,504 B1 | 5/2003 | Kercheval et al. |
| 6,567,787 B1 | 5/2003 | Walker et al. |
| 6,574,605 B1 | 6/2003 | Sanders et al. |
| 6,598,020 B1 | 7/2003 | Kleindienst et al. |
| 6,600,821 B1 | 7/2003 | Chan et al. |
| 6,601,031 B1 | 7/2003 | O'Brien |
| 6,611,498 B1 | 8/2003 | Baker et al. |
| 6,628,777 B1 | 9/2003 | McIllwaine et al. |
| 6,643,622 B2 | 11/2003 | Stuart et al. |
| 6,647,372 B1 | 11/2003 | Brady et al. |
| 6,658,388 B1 | 12/2003 | Kleindienst et al. |

(56) References Cited

U.S. PATENT DOCUMENTS

| | | |
|---|---|---|
| 6,658,391 B1 | 12/2003 | Williams et al. |
| 6,662,156 B2 | 12/2003 | Bartosik |
| 6,665,644 B1 | 12/2003 | Kanevsky et al. |
| 6,674,447 B1 | 1/2004 | Chiang et al. |
| 6,691,073 B1 | 2/2004 | Erten et al. |
| 6,700,972 B1 | 3/2004 | McGugh et al. |
| 6,721,417 B2 | 4/2004 | Saito et al. |
| 6,721,704 B1 | 4/2004 | Strubbe et al. |
| 6,724,887 B1 | 4/2004 | Eilbacher et al. |
| 6,731,307 B1 | 5/2004 | Strubbe et al. |
| 6,731,744 B1 | 5/2004 | Khuc et al. |
| 6,735,298 B2 | 5/2004 | Neyman et al. |
| 6,741,697 B2 | 5/2004 | Benson et al. |
| 6,744,877 B1 | 6/2004 | Edwards |
| 6,760,414 B1 | 7/2004 | Schurko et al. |
| 6,760,727 B1 | 7/2004 | Schroeder et al. |
| 6,766,012 B1 | 7/2004 | Crossley |
| 6,788,768 B1 | 9/2004 | Saylor et al. |
| 6,798,876 B1 | 9/2004 | Bala |
| 6,839,671 B2 | 1/2005 | Attwater et al. |
| 6,853,966 B2 | 2/2005 | Bushey et al. |
| 6,864,901 B2 | 3/2005 | Chang et al. |
| 6,868,154 B1 | 3/2005 | Stuart et al. |
| 6,868,392 B1 | 3/2005 | Ogasawara |
| 6,959,079 B2 | 10/2005 | Elazar |
| 7,010,106 B2 | 3/2006 | Gritzer et al. |
| 7,010,109 B2 | 3/2006 | Gritzer et al. |
| 7,027,708 B2 | 4/2006 | Nygren et al. |
| 7,043,745 B2 | 5/2006 | Nygren et al. |
| 7,184,540 B2 | 2/2007 | Dezonno et al. |
| 7,219,138 B2 | 5/2007 | Straut et al. |
| 7,995,717 B2 | 8/2011 | Conway et al. |
| 8,781,102 B2 | 7/2014 | Conway et al. |
| 2001/0043685 A1 | 11/2001 | Bscheider et al. |
| 2002/0002460 A1 | 1/2002 | Pertrushin |
| 2002/0010587 A1 | 1/2002 | Pertrushin |
| 2002/0111811 A1 | 8/2002 | Bares et al. |
| 2002/0133394 A1 | 9/2002 | Bushey et al. |
| 2002/0194002 A1 | 12/2002 | Petrushin |
| 2003/0033145 A1 | 2/2003 | Petrushin |
| 2003/0033152 A1 | 2/2003 | Cameron |
| 2003/0069780 A1 | 4/2003 | Hailwood et al. |
| 2003/0072463 A1 | 4/2003 | Chen |
| 2003/0154092 A1 | 8/2003 | Bouron et al. |
| 2004/0041830 A1 | 3/2004 | Chiang et al. |
| 2004/0054715 A1 | 3/2004 | Cesario |
| 2004/0073569 A1 | 4/2004 | Knott et al. |
| 2004/0100507 A1 | 5/2004 | Hayner et al. |
| 2004/0101127 A1 | 5/2004 | Dezonno et al. |
| 2004/0117185 A1 | 6/2004 | Scarano et al. |
| 2004/0162724 A1 | 8/2004 | Hill et al. |
| 2004/0181376 A1 | 9/2004 | Fables et al. |
| 2004/0249636 A1 | 12/2004 | Applebaum et al. |
| 2004/0264652 A1 | 12/2004 | Erhart et al. |
| 2005/0010411 A1 | 1/2005 | Rigazio et al. |
| 2005/0010415 A1 | 1/2005 | Hagen et al. |
| 2005/0018622 A1 | 1/2005 | Halbraich et al. |
| 2005/0108383 A1 | 5/2005 | DeHaas et al. |
| 2005/0123115 A1 | 6/2005 | Gritzer et al. |
| 2006/0200520 A1 | 9/2006 | Vernon et al. |
| 2006/0224937 A1 | 10/2006 | Sudoh et al. |
| 2007/0010993 A1* | 1/2007 | Bachenko et al. ................ 704/9 |
| 2007/0106792 A1 | 5/2007 | Blumenau |
| 2008/0015865 A1 | 1/2008 | Chiu |
| 2011/0249811 A1 | 10/2011 | Conway et al. |

FOREIGN PATENT DOCUMENTS

| | | |
|---|---|---|
| EP | 0998108 A1 | 5/2000 |
| EP | 1361739 A1 | 11/2003 |
| EP | 1377907 A2 | 1/2004 |
| EP | 1635534 A2 | 3/2006 |
| GB | 2331201 | 5/1999 |
| GB | 2389736 A | 12/2003 |
| WO | WO0174042 A2 | 10/2001 |
| WO | WO 02073413 A2 | 9/2002 |
| WO | WO 03001809 A1 | 1/2003 |
| WO | WO 03009175 A1 | 1/2003 |

OTHER PUBLICATIONS

Abstract of: Retail Banker International, "Efficiency Ratio (ER), Is Increasingly Being Looked to by Bankers, Analysts as a Yardstick of Operating Success, in Era of Permanent Downsizing and Cost Reduction," vol. 341, published in Ireland; Jan. 1996, 2 pages.

Abstract of: Call Center Magazine, "The Most Innovative Call Center Products We Saw in 1999," vol. 13, No. 2, 1 page.

Abstract of: Kohli, Rajiv, et al., Journal of System Management, "Strategic Application of Organization Data Through Customer Relational Databases," vol. 44, No. 10, Oct. 1993, 1 page.

Abstract of: Sullivan, Kristina B., PC Week, Product Announcement, "Software Helps Salespeople Generate New Leads," vol. 3, No. 38, Sep. 1986, 1 page.

Abstract of: Garrison, P., Computing for Business, "An Electric Sales Call File," vol. 9, No. 4, Sep. 1984, 1 page.

Abstract of: Killenbrew, Wayne, et al., Telephony, "Playing by the Rules," vol. 235, No. 25, Dec. 1998, 1 page.

Abstract of: Testa, Bridget Mintz, Telecommunicatons Americas, "Call Monitoring Gets Emotional," vol. 38, No. 13, Dec. 2004, 1 page.

Abstract of: Tan, Run-Hua, et al., Journal of Hebei University of Technology, "Innovation Design of Product Based on TRIZ," vol. 33, No. 2, 2004.

Abstract of: Newswire, "etalk and Utopy to Provide Enhanced Quality Monitoring and Speech Analytics Solutions to Contact Centers," Apr. 2003.

* cited by examiner

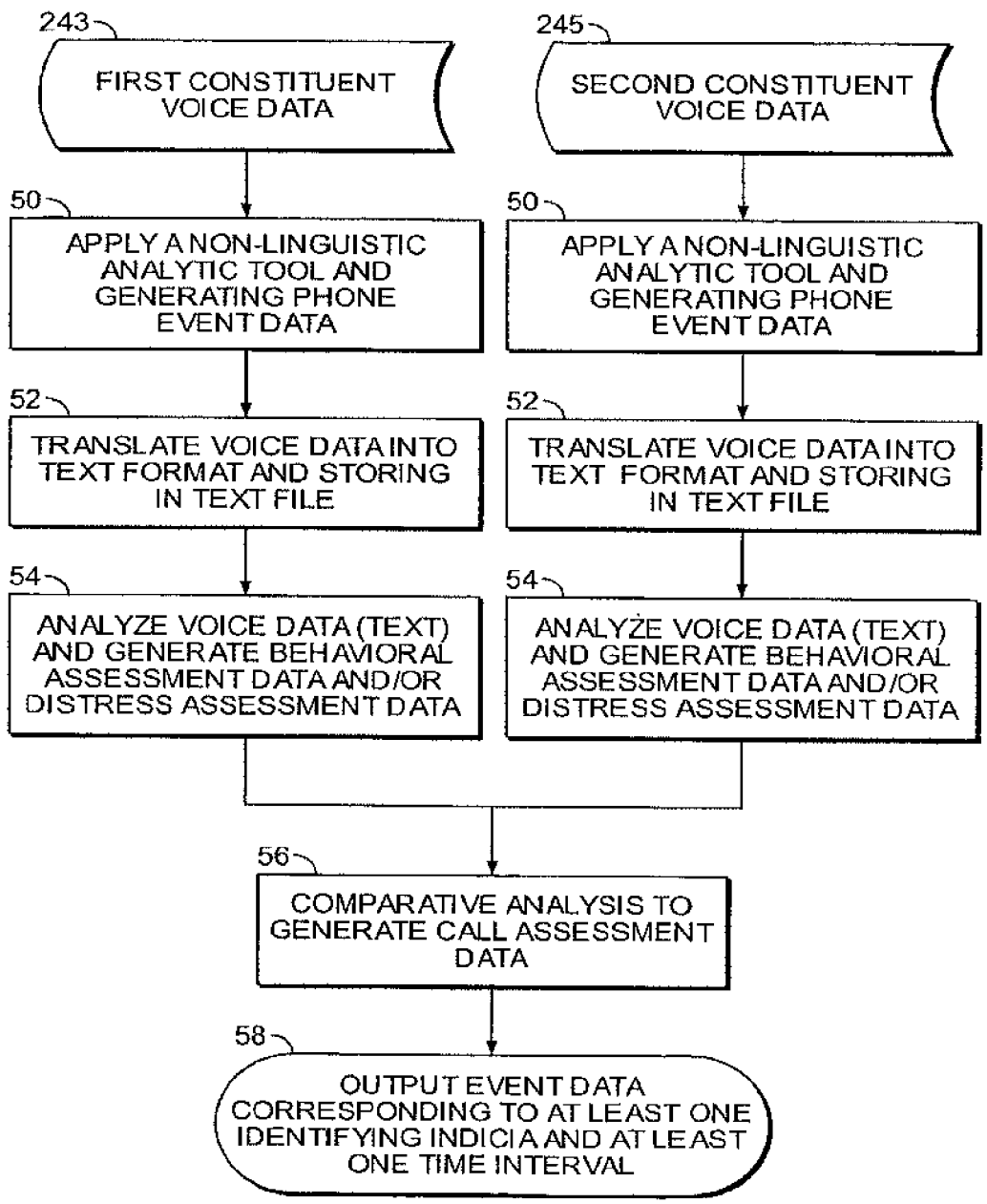

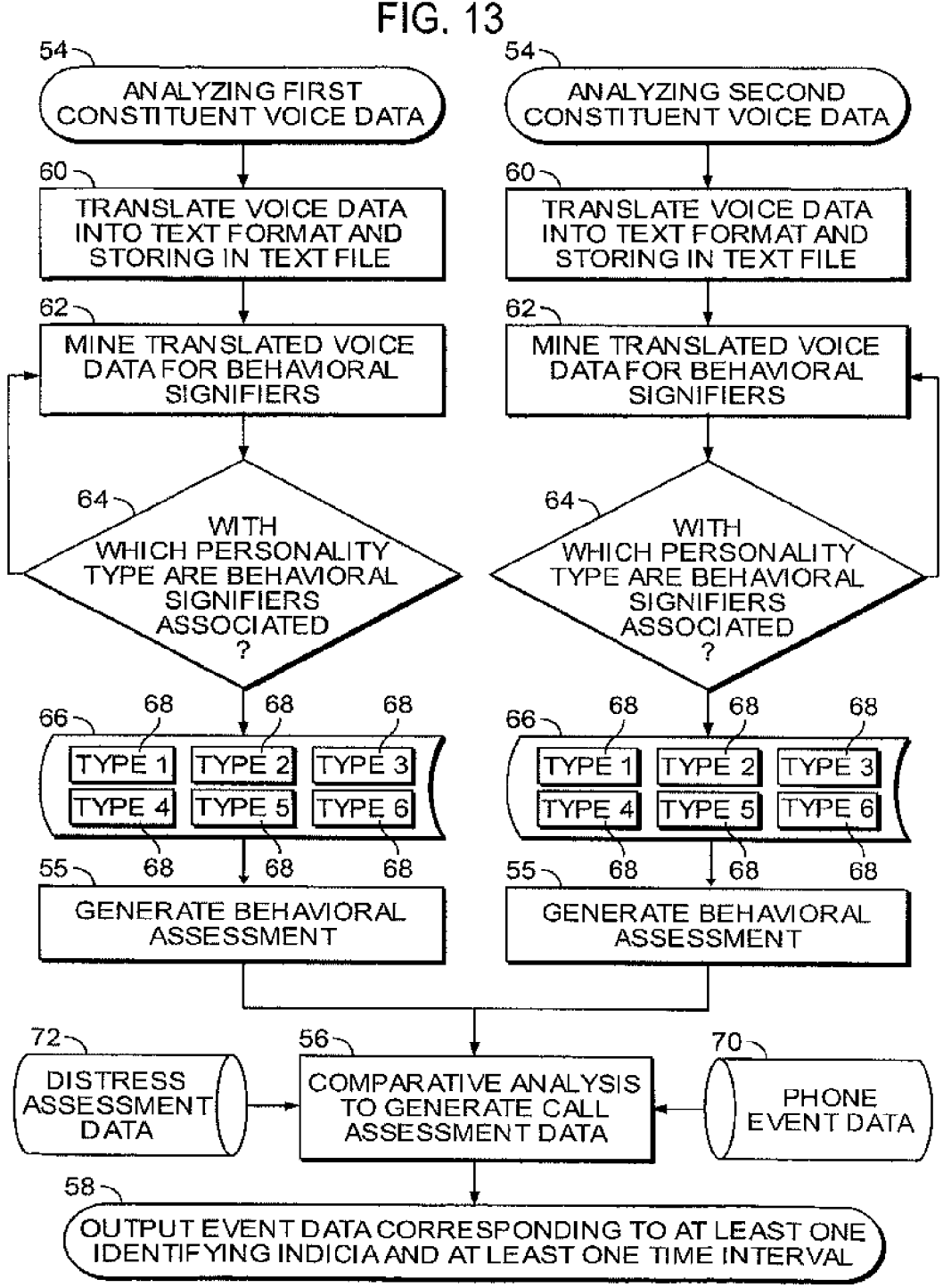

FIG. 14

Before Signing In, Please Read the Following Terms and Conditions:

Your access to and use of this portal is subject to the following terms and conditions and, by accessing and using this portal, you accept these terms and conditions, without limitation or qualification. Any violation of these terms and conditions will subject the violator to disciplinary action, including, without limitation, termination of employment.

All of the information on this portal is to be considered highly confidential and proprietary. No information on this portal is to be shared with or provided to any third party. No such information may be used for any purpose other than the internal business purposes of eLoyalty, as directed by authorized eLoyalty representatives. No access to this site is to be given to any person other than employees of eLoyalty.

These restrictions result from contractual obligations with eLoyalty, the violation of which could subject eLoyalty to significant liability, monetary and otherwise.

In the event that you cease to be an eLoyalty employee for any reason, you agree to immediately terminate any and all use of this site, to return or destroy (at eLoyalty's sole election, following consultation with your immediate supervisor) any and all copies of materials obtained from this site and to immediately cease the use of any of the same.

I agree to these terms and conditions. ☐

[Sign In]

Name _____ 404
Password _____ 406

Username and passwords are personal to each user and may not be shared with others.

Reset my Access Information
Change Playback Device

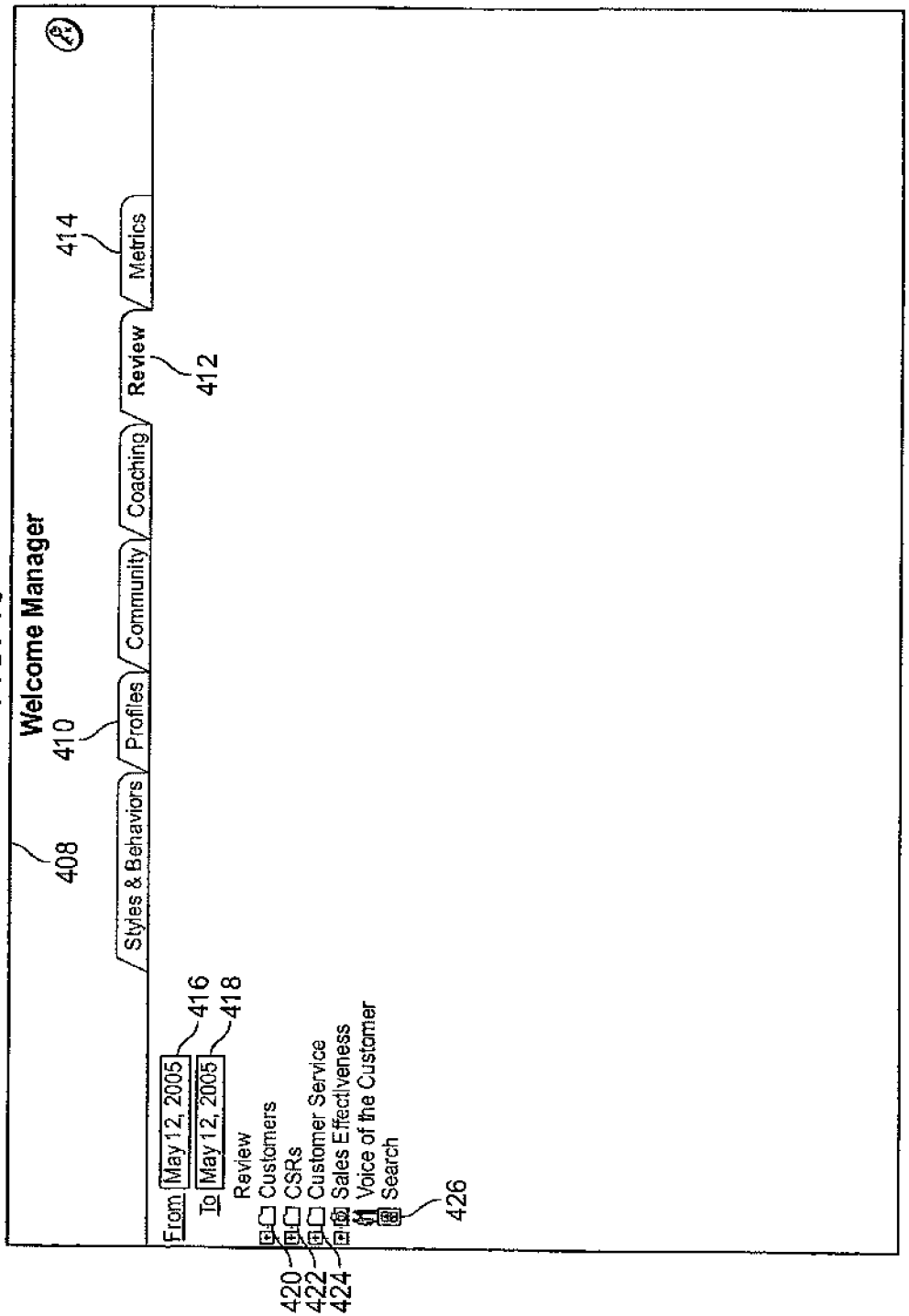

FIG. 16

Welcome Manager

| Styles & Behaviors | Profiles | Community | Coaching | Review | Metrics |

Call Number [ ]  choose for any Customer  Holds(secs): start no limit - end no limit  Duration (mins.): [ ] to [ ]
                 choose for any Team        Time Range:  start no limit - end no limit  ☑Inbound ☑Outbound
                 choose for any CSR         Language:    choose all languages           ☑Analyzed ☐NonAnalyzed
                                            Transfers:   ☑No Transfers ☐Transfers To: choose all transfers

428 →

Search Results                                          Listing 861 of 861 Recordings between Apr 1st and 30th

| Id | ○ Dir ▽ | ANI ▽ | Customer ▽ | Call Type ▽ | CSR ▽ | Length | Date | Time |
|---|---|---|---|---|---|---|---|---|
| 377652 | ○ In | | -- Home Tech Support | ValueLoad | Nora Rodriguez | 3:26 | Fri 04/01 | 7:07 am |
| 377664 | ○ In | | -- ELOY CashPay | Balance | Nora Rodriguez | 1:46 | Fri 04/01 | 7:12 am |
| 377857 | ○ In | | -- Insurance 10 | Balance | Nora Rodriguez | 1:32 | Fri 04/01 | 7:44 am |
| 377914 | ○ In | | -- ELOY CashPay | Refund | Nora Rodriguez | 0:08 | Fri 04/01 | 7:55 am |
| 377940 | ○ In | | -- Insurance 10 | Refund | Nora Rodriguez | 0:53 | Fri 04/01 | 7:57 am |
| 378088 | ○ In | | -- Eloy Card1 Gift Card | Close | Nora Rodriguez | 4:03 | Fri 04/01 | 8:11 am |
| 378044 | ○ In | | -- ELOY Cash Cust Srve | Balance | Nora Rodriguez | 1:26 | Fri 04/01 | 8:11 am |
| 378111 | ○ In | | -- Secure Card | ValueLoad | Nora Rodriguez | 2:17 | Fri 04/01 | 8:17 am |
| 378202 | ○ In | | -- Bank Card | Balance | Andy Francois | 2:35 | Fri 04/01 | 8:25 am |
| 378250 | ○ In | | -- Eloy Card1 Gift Card | Delivery | Nora Rodriguez | 4:18 | Fri 04/01 | 8:26 am |
| 378350 | ○ In | | -- Secure Card | Close | Nora Rodriguez | 0:22 | Fri 04/01 | 8:43 am |
| 378566 | ○ In | 918-008-4140 | ELOY Bank3 | Refund | Andy Francois | 6:31 | Fri 04/01 | 8:52 am |
| 378598 | ○ In | 918-883-0983 | Insurance 3 | Refund | Nora Rodriguez | 2:23 | Fri 04/01 | 9:03 am |
| 378802 | ○ In | | -- Cash Service 1 | Activation | Andy Francois | 8:56 | Fri 04/01 | 9:06 am |
| 378694 | ○ In | | -- Secure Card | Refund | Nora Rodriguez | 3:30 | Fri 04/01 | 9:09 am |
| 378889 | ○ In | | -- Cash Service 1 | Balance | Andy Francois | 1:07 | Fri 04/01 | 9:30 am |
| 379019 | ○ In | | -- State Bank 5 ACT | Refund | Nora Rodriguez | 2:41 | Fri 04/01 | 9:38 am |

430

From [Apr 1, 2005]
To [Apr 30, 2005] Search

Review
☐ Customers
☐ CSRs
☐ Customer Service
☑ Sales Effectiveness
☐ Voice of the Customer
Search

FIG. 18

Welcome Manager

Styles & Behaviors / Profiles / Community / Coaching / Review / Metrics

Call Description. This record was inserted by Folder Initiator

Analytic Engine

Start 0:00  Stop 3:40.626667023  Duration 3:40.626667023  Loaded 100%

Reload  Refresh Data

- Summary
- Statistics
- Comments
- Customer Connections™
- Analytics

Call Type Fee
 CSR Jamal Rice  456
 Customer Gift Card (Financial Services 7)
 Date 11:10 pm, Jan 1, 2005  458
 Duration 9:39
 ID Number 1399

Call Statistics

| | | |
|---|---|---|
| Call Duration | 9:39 | |
| Average Duration for This Call Type | 3:25 | |
| % of Average | 282% | |
| Customer Talk % (Time) | 0% | (0:00) |
| CSR Talk % (Time) | 0% | (0:00) |
| # of Holds > 30 seconds (Time) | 2 | (4:59) |
| # of Silences > 20 and < seconds (Time) | 0 | (0:00) |
| # of Silences > seconds (Time) | 0 | (0:00) |
| Customer Distress | Yes | |
| Customer Satisfaction Score | 50 | |
| CSR Appropriate Response | No | |
| CSR Distress | No | |
| CSR Performance Score | 85 | |
| Call Transfer | Yes | |

FIG. 19

Welcome Manager

Styles & Behaviors / Profiles / Community / Coaching / Review / Metrics

Client Weekly Reports

460

Report Time Range
Date: CurrentWeek ▼

Summary Reports
☐ Breakdown by Day
☒ Client Satisfaction
☒ Summary By Call Type

Client Detail Reports
Check / Clear All

| | | | |
|---|---|---|---|
| ☐ Benefits Program | ☐ Financial Services 1 | ☐ Financial Services 10 | ☐ Financial Services 2 |
| ☐ Financial Services 3 | ☐ Financial Services 4 | ☐ Financial Services 5 | ☐ Financial Services 6 |
| ☐ Financial Services 7 | ☐ Financial Services 8 | ☐ Financial Services 9 | ☐ Insurance 1 |
| ☐ Insurance 10 | ☐ Insurance 2 | ☐ Insurance 3 | ☐ Insurance 4 |
| ☐ Insurance 5 | ☐ Insurance 6 | ☐ Insurance 7 | ☐ Insurance 8 |
| ☐ Insurance 9 | ☐ Malls 1 | ☐ Malls 10 | ☐ Malls 2 |
| ☐ Malls 3 | ☐ Malls 4 | ☐ Malls 5 | ☐ Malls 6 |
| ☐ Malls 7 | ☐ Malls 8 | ☐ Malls 9 | ☐ Public Assist |
| ☐ Retail 1 | ☐ Retail 10 | ☐ Retail 2 | ☐ Retail 3 |
| ☐ Retail 4 | ☐ Retail 5 | ☐ Retail 6 | ☐ Retail 7 |

Metrics
- Standard Reports
  - Daily
  - Weekly
    - Client
    - CSR
  - Monthly
  - Quarterly
  - Annual
- On-Demand Reports
  - Dashboard

Client Satisfaction Report

Report Date Range: Mon Apr 18, 2005 - Sun Apr 24, 2005
Report Created For: Manager Demo
Results By: Client Calls Analyzed: 202

| Client | # of Calls | Average Duration | > 150% Duration | > 30 Sec. Hold | > 20 Sec. Silence | Customer Dis. | Program Dis. | Caller Sat. |
|---|---|---|---|---|---|---|---|---|
| Bachmayer Equip. | 5 | 5:25 | 60% | 20% | 40% | 20% | 0% | 78 |
| Bank 5 Card Services | 3 | 2:40 | 33% | 0% | 67% | 33% | 0% | 80 |
| ELOY Bank3 | 13 | 4:31 | 31% | 31% | 23% | 15% | 0% | 85 |
| Financial Services 1 | 2 | 3:13 | 0% | 0% | 0% | 0% | 0% | 100 |
| Financial Services 10 | 37 | 6:19 | 43% | 49% | 24% | 5% | 0% | 83 |
| Financial Services 3 | 25 | 3:59 | 28% | 12% | 36% | 8% | 0% | 88 |
| Financial Services 4 | 4 | 5:06 | 75% | 0% | 0% | 0% | 0% | 85 |
| Financial Services 7 | 42 | 2:55 | 24% | 31% | 7% | 2% | 0% | 91 |
| Insurance 10 | 21 | 2:15 | 5% | 0% | 14% | 10% | 0% | 96 |
| Insurance 4 | 1 | 1:19 | 0% | 0% | 0% | 0% | 0% | 100 |
| Insurance 6 | 6 | 3:18 | 33% | 0% | 17% | 0% | 0% | 92 |
| Insurance 9 | 3 | 4:14 | 33% | 0% | 33% | 33% | 0% | 84 |
| Malls 2 | 1 | 1:15 | 0% | 0% | 0% | 0% | 0% | 100 |
| Malls 9 | 4 | 2:33 | 25% | 25% | 25% | 0% | 0% | 90 |
| Public Assist | 11 | 4:31 | 18% | 27% | 18% | 9% | 0% | 90 |
| Retail 10 | 5 | 4:44 | 20% | 0% | 40% | 0% | 0% | 92 |
| Retail 8 | 2 | 3:09 | 0% | 0% | 50% | 0% | 0% | 95 |
| SmallTown Mall | 3 | 2:35 | 33% | 0% | 33% | 0% | 0% | 90 |
| someFunds | 1 | 3:02 | 0% | 0% | 100% | 0% | 0% | 90 |
| ZZZ Customer | 13 | 4:40 | 38% | 46% | 15% | 23% | 0% | 82 | report page 1

FIG. 21

| Filter | Weight |
| --- | --- |
| >150% Duration | 20% |
| >90 Sec. Hold | 10% |
| >30 Sec. Silence | 10% |
| Caller Distress | 20% |
| Program Dissatisfaction | 20% |

FIG. 22

Client Summary By Call Type Report

Report Date Range: Mon Apr 18, 2005 - Sun Apr 24, 2005
Report Created For: Manager Demo
Results By: Call Type Calls Analyzed: 202

*report page 1*

| Call Type | # of Calls | Average Duration | > 150% Duration | > 30 Sec. Hold | > 20 Sec. Silence | Customer Dis. | Program Dis. | Caller Sat |
|---|---|---|---|---|---|---|---|---|
| Activation | 27 | 2:12 | 26% | 11% | 15% | 11% | 0% | 90 |
| Balance | 27 | 2:31 | 26% | 4% | 37% | 7% | 0% | 89 |
| ChangeRequest | 7 | 2:44 | 29% | 29% | 0% | 0% | 0% | 91 |
| Close | 17 | 4:06 | 41% | 35% | 18% | 24% | 0% | 82 |
| Decline | 22 | 5:54 | 36% | 36% | 32% | 5% | 0% | 85 |
| Delivery | 2 | 9:56 | 100% | 100% | 50% | 0% | 0% | 65 |
| Dispute | 10 | 5:56 | 10% | 20% | 40% | 20% | 0% | 88 |
| Fee | 13 | 3:13 | 31% | 23% | 0% | 8% | 0% | 90 |
| Lost | 25 | 5:46 | 36% | 40% | 28% | 8% | 0% | 84 |
| Refund | 9 | 4:11 | 22% | 11% | 11% | 0% | 0% | 93 |
| Tolerance | 3 | 3:37 | 0% | 0% | 0% | 0% | 0% | 100 |
| Transactional | 4 | 3:28 | 25% | 40% | 0% | 0% | 0% | 95 |
| Use | 15 | 2:54 | 13% | 20% | 33% | 7% | 0% | 93 |
| ValueLoad | 15 | 5:47 | 27% | 33% | 17% | 0% | 0% | 88 |
| WebSite | 6 | 2:40 | 33% | 24% | 21% | 8% | 0% | 88 |
| Total | 202 | 4:04 | 29% | | | | | 88 |

FIG. 23

Non-Analyzed Calls

Report Date Range: Fri Apr 01, 2005 - Sat Apr 30, 2005
Report Created For: Manager Demo
Results By: Client report page 1

| Client | # of Calls | Calls Analyzed | % Calls Analyzed | Total Talk Hours | Hours Analyzed | % Hours Analyzed | % Hours of Tot Hours |
|---|---|---|---|---|---|---|---|
| Bachmayer Equip. | 102 | 6 | 6% | 7.3 | 0.5 | 6% | 0.91% |
| Bank 5 Card Services | 25 | 10 | 40% | 1.4 | 0.5 | 36% | 0.94% |
| Bank Ball | 1 | 0 | 0% | 0.2 | 0.0 | 0% | 0% |
| Chef Aid | 5 | 4 | 80% | 0.5 | 0.4 | 85% | 0.82% |
| ELOY Bank3 | 4 | 0 | 0% | 0.0 | 0.0 | 0% | 0% |
| ELOY Bank3 | 166 | 78 | 47% | 17.9 | 7.8 | 44% | 15.1% |
| Financial Services 1 | 4 | 3 | 75% | 0.2 | 0.1 | 78% | 0.27% |
| Financial Services 10 | 403 | 165 | 41% | 33.8 | 13.1 | 39% | 25.4% |
| Financial Services 3 | 209 | 81 | 39% | 10.9 | 4.8 | 44% | 9.3% |
| Financial Services 4 | 37 | 17 | 46% | 1.7 | 0.8 | 50% | 1.6% |
| Financial Services 5 | 8 | 2 | 25% | 0.6 | 0.0 | 6% | 0.08% |
| Financial Services 7 | 380 | 169 | 44% | 15.3 | 6.5 | 42% | 12.6% |
| Financial Services 8 | 1 | 1 | 100% | 0.0 | 0.0 | 100% | 0.08% |
| Insurance 1 | 3 | 1 | 33% | 0.1 | 0.0 | 18% | 0.05% |
| Insurance 10 | 171 | 80 | 47% | 6.5 | 2.6 | 41% | 5.1% |
| Insurance 3 | 23 | 8 | 35% | 1.0 | 0.3 | 27% | 0.53% |
| Insurance 4 | 2 | 1 | 50% | 0.1 | 0.0 | 26% | 0.04% |
| Insurance 6 | 28 | 18 | 64% | 1.8 | 1.1 | 60% | 2.1% |
| Insurance 8 | 2 | 2 | 100% | 0.1 | 0.1 | 100% | 0.18% |
| Insurance 9 | 17 | 8 | 47% | 1.2 | 0.6 | 49% | 1.2% |

Client Detail Report

Report Date Range: Fri Apr 01, 2005 - Sat Apr 30, 2005
Report Created For: Manager Demo
Client: Financial Services 10
Results By: Call Type Calls Analyzed: 165

| Call Type | # of Calls | Average Duration | > 150% Duration | > 30 Sec. Hold | > 20 Sec. Silence | Customer Dis. | Program Dis. | Caller Sat |
|---|---|---|---|---|---|---|---|---|
| Activation | 13 | 3:27 | 15% | 31% | 23% | 8% | 0% | 90 |
| Balance | 18 | 2:24 | 28% | 22% | 17% | 0% | 0% | 91 |
| ChangeRequest | 11 | 3:54 | 45% | 27% | 27% | 0% | 0% | 86 |
| Close | 16 | 2:46 | 13% | 13% | 6% | 19% | 0% | 92 |
| Decline | 11 | 5:55 | 55% | 45% | 9% | 0% | 0% | 84 |
| Delivery | 4 | 4:25 | 25% | 25% | 50% | 0% | 0% | 88 |
| Dispute | 13 | 9:47 | 38% | 62% | 31% | 8% | 0% | 82 |
| Fee | 3 | 1:50 | 0% | 0% | 33% | 0% | 0% | 97 |
| Lost | 35 | 6:00 | 31% | 49% | 20% | 0% | 3% | 86 |
| Refund | 8 | 2:08 | 25% | 13% | 25% | 0% | 13% | 89 |
| Tolerance | 1 | 8:21 | 100% | 100% | 0% | 0% | 0% | 70 |
| Transactional | 1 | 5:03 | 100% | 100% | 100% | 0% | 0% | 60 |
| Use | 2 | 8:03 | 50% | 50% | 50% | 0% | 0% | 80 |
| ValueLoad | 25 | 5:25 | 32% | 60% | 12% | 12% | 0% | 84 |
| WebSite | 4 | 0:58 | 25% | 0% | 0% | 0% | 0% | 95 |
| Total | 165 | 4:46 | 31% | 38% | 19% | 5% | 1% | 87 | report page 1

FIG. 25

Client Detail Report

Report Date Range: Fri Apr 01, 2005 - Sat Apr 30, 2005
Report Created For: Manager Demo
Client: Financial Services 10
Program: Cash Service 1
Results By: Call Type Calls Analyzed: 165

| Call Type | # of Calls | Average Duration | > 150% Duration | > 30 Sec. Hold | > 20 Sec. Silence | Customer Dis. | Program Dis. | Caller Sat. |
|---|---|---|---|---|---|---|---|---|
| Activation | 13 | 3:27 | 15% | 31% | 23% | 8% | 0% | 90 |
| Balance | 18 | 2:24 | 28% | 22% | 17% | 0% | 0% | 91 |
| ChangeRequest | 11 | 3:54 | 45% | 27% | 27% | 0% | 0% | 86 |
| Close | 16 | 2:46 | 13% | 13% | 6% | 19% | 0% | 92 |
| Decline | 11 | 5:55 | 55% | 45% | 9% | 0% | 0% | 84 |
| Delivery | 4 | 4:25 | 25% | 25% | 50% | 0% | 0% | 88 |
| Dispute | 13 | 9:47 | 38% | 62% | 31% | 8% | 0% | 82 |
| Fee | 3 | 1:50 | 0% | 0% | 33% | 0% | 0% | 97 |
| Lost | 35 | 6:00 | 31% | 49% | 20% | 0% | 3% | 86 |
| Refund | 8 | 2:08 | 25% | 13% | 25% | 0% | 13% | 89 |
| Tolerance | 1 | 8:21 | 100% | 100% | 0% | 0% | 0% | 70 |
| Transactional | 1 | 5:03 | 100% | 100% | 100% | 0% | 0% | 60 |
| Use | 2 | 8:03 | 50% | 50% | 50% | 0% | 0% | 80 |
| ValueLoad | 25 | 5:25 | 32% | 60% | 12% | 12% | 0% | 84 |
| WebSite | 4 | 0:58 | 25% | 0% | 0% | 0% | 0% | 95 |
| Total | 165 | 4:46 | 31% | 38% | 19% | 5% | 1% | 87 | report page 1

FIG. 26

CSR Performance Report

Report Date Range: Fri Apr 01, 2005 - Sat Apr 30, 2005
Report Created By: Manager Demo
Results By: Location Calls Analyzed: 861

| Location | # of Calls | Average Duration | > 150% Duration | > 30 Sec. Hold | > 20 Sec. Silence | Call Transfer | Distn. | App. Resp. | No Auth. | Score |
|---|---|---|---|---|---|---|---|---|---|---|
| Austin | 861 | 3:36 | 26% | 21% | 18% | 10% | 0.5% | 84% | 23% | 88 |
| Total | 861 | 3:36 | 26% | 21% | 18% | 10% | 0.5% | 84% | 23% | 88 | report page 1

FIG. 27

| Filter | Weight |
|---|---|
| >150% Duration | 10% |
| >90 Sec. Hold | 5% |
| >30 Sec. Silence | 5% |
| Inappropriate Response | 30% |
| Appropriate Response | 30% |
| Absent CSR | 20% |
| No Authentication | 30% |

FIG. 28

CSR Performance Report

Report Date Range: Fri Apr 01, 2005 - Sat Apr 30, 2005
Report Created For: Manager Demo
Results By: CSR Calls Analyzed: 861

| CSR | # of Calls | Average Duration | > 150% Duration | > 30 Sec. Hold | > 20 Sec. Silence | Call Transfer | CSR Distn. | App. Resp. | No Auth. | Score |
|---|---|---|---|---|---|---|---|---|---|---|
| Andy Francois | 355 | 4:30 | 32% | 38% | 15% | 16% | 0.3% | 93% | 13% | 90 |
| Nora Rodriguez | 506 | 2:58 | 21% | 8% | 19% | 6% | 0.6% | 75% | 30% | 87 |
| Total | 861 | 3:36 | 26% | 21% | 18% | 10% | 0.5% | 84% | 23% | 88 | report page 1

Non-Analyzed Calls

Report Date Range: Fri Apr 01, 2005 - Sat Apr 30, 2005
Report Created For: Manager Demo
Results By: CSR report page 1

| CSR | # of Calls | Calls Analyzed | % Calls Analyzed | Total Talk Hours | Hours Analyzed | % Hours Analyzed |
|---|---|---|---|---|---|---|
| Andy Francois | 792 | 355 | 45% | 61.9 | 26.6 | 43% |
| Nora Rodriguez | 1256 | 506 | 40% | 65.4 | 25.0 | 38% |
| Total | 2048 | 861 | 42% | 127.3 | 51.6 | 41% |

Location By Team Report

Report Date Range: Fri Apr 01, 2005 - Sat Apr 30, 2005
Report Created For: Manager Demo
Location: All
Results By: Team Calls Analyzed: 861

| Team | # of Calls | Average Duration | > 150% Duration | > 30 Sec. Hold | > 20 Sec. Silence | Call Transfer | Distn. | App. Resp. | No Auth. | Score |
|---|---|---|---|---|---|---|---|---|---|---|
| Beni Wool | 355 | 4:30 | 32% | 38% | 15% | 16% | 0.3% | 93% | 13% | 90 |
| Carol Stewart-Palmer | 506 | 2:58 | 21% | 8% | 19% | 6% | 0.6% | 75% | 30% | 87 |
| Total | 861 | 3:36 | 26% | 21% | 18% | 10% | 0.5% | 84% | 23% | 88 |

532

*report page 1*

FIG. 31

Team By Agent Report

Report Date Range: Fri Apr 01, 2005 - Sat Apr 30, 2005
Report Created BY: Manager Demo
Results By: Agent
Team: Beni Wool Calls Analyzed: 355

| Agent | # of Calls | Average Duration | > 150% Duration | > 30 Sec. Hold | > 20 Sec. Silence | Call Transfer | Agent Distn. | App. Resp. | No Auth. | Score |
|---|---|---|---|---|---|---|---|---|---|---|
| Andy Francois | 355 | 4:30 | 32% | 38% | 15% | 16% | 0.3% | 93% | 13% | 90 |
| Total | 355 | 4:30 | 32% | 38% | 15% | 16% | 0.3% | 93% | 13% | 90 |

*report page 1*

CSR By Call Type Report

Report Date Range: Fri Apr 01, 2005 - Sat Apr 30, 2005
Report Created For: Manager Demo
CSR: Andy Francois
Results By: Call Type Calls Analyzed: 355

| Call Type | # of Calls | Average Duration | > 150% Duration | > 30 Sec. Hold | > 20 Sec. Silence | Call Transfer | CSR Distr. | App. Resp. | No Auth. | Score |
|---|---|---|---|---|---|---|---|---|---|---|
| Activation | 22 | 2:59 | 14% | 18% | 23% | 23% | 0% | 100% | 18% | 91 |
| Balance | 43 | 2:28 | 30% | 21% | 23% | 16% | 0% | 0% | 16% | 90 |
| ChangeRequest | 19 | 4:13 | 58% | 37% | 11% | 11% | 0% | 0% | 5% | 90 |
| Close | 34 | 2:39 | 26% | 24% | 6% | 18% | 0% | 50% | 3% | 95 |
| Decline | 28 | 5:19 | 32% | 39% | 18% | 11% | 0% | 100% | 7% | 92 |
| Delivery | 5 | 4:15 | 20% | 20% | 40% | 0% | 0% | 0% | 0% | 95 |
| Dispute | 18 | 8:04 | 39% | 56% | 28% | 11% | 0% | 100% | 17% | 87 |
| Fee | 18 | 4:19 | 33% | 39% | 11% | 11% | 0% | 0% | 28% | 86 |
| Lost | 56 | 7:36 | 46% | 59% | 14% | 9% | 2% | 100% | 21% | 85 |
| Refund | 10 | 3:40 | 40% | 40% | 10% | 30% | 0% | 0% | 10% | 91 |
| Tolerance | 1 | 8:21 | 100% | 100% | 0% | 0% | 0% | 0% | 100% | 55 |
| Transactional | 2 | 3:50 | 50% | 50% | 50% | 0% | 0% | 0% | 50% | 75 |
| Use | 45 | 2:54 | 18% | 38% | 9% | 38% | 0% | 100% | 2% | 95 |
| ValueLoad | 42 | 5:31 | 31% | 48% | 17% | 2% | 0% | 100% | 19% | 88 |
| WebSite | 12 | 1:43 | 17% | 17% | 0% | 42% | 0% | 0% | 0% | 97 |
| Total | 355 | 4:30 | 32% | 38% | 15% | 16% | 0.3% | 93% | 13% | 90 | report page 1

536

METHOD AND SYSTEM FOR ANALYZING A COMMUNICATION BY APPLYING A BEHAVIORAL MODEL THERETO

CROSS-REFERENCE TO RELATED APPLICATIONS

The present invention is a continuation of U.S. patent application Ser. No. 14/072,479, filed Nov. 5, 2013, now allowed, which is a continuation of U.S. patent application Ser. No. 13/165,149, filed Jun. 21, 2011, now U.S. Pat. No. 8,594,285, issued Nov. 26, 2013, which is a continuation of U.S. patent application Ser. No. 11/131,850, filed May 18, 2005, now U.S. Pat. No. 7,995,717, issued Aug. 9, 2011, the entire contents of each of which are hereby incorporated herein by express reference thereto.

TECHNICAL FIELD

The invention relates to a method and system for analyzing an electronic communication, more particularly, to analyzing a telephone communication between a customer and a contact center by applying a psychological behavioral model thereto.

BACKGROUND OF THE INVENTION

It is known to utilize telephone call centers to facilitate the receipt, response and routing of incoming telephone calls relating to customer service, retention, and sales. Generally, a customer is in contact with a customer service representative ("CSR") or call center agent who is responsible for answering the customer's inquiries and/or directing the customer to the appropriate individual, department, information source, or service as required to satisfy the customer's needs.

It is also well known to monitor calls between a customer and a call center agent. Accordingly, call centers typically employ individuals responsible for listening to the conversation between the customer and the agent. Many companies have in-house call centers to respond to customers' complaints and inquiries. In many cases, however, it has been found to be cost effective for a company to hire third party telephone call centers to handle such inquiries. As such, the call centers may be located thousands of miles away from the actual sought manufacturer or individual. This often results in use of inconsistent and subjective methods of monitoring, training and evaluating call center agents. These methods also may vary widely from call center to call center.

While monitoring such calls may occur in real time, it is often more efficient and useful to record the call for later review. Information gathered from the calls is typically used to monitor the performance of the call center agents to identify possible training needs. Based on the review and analysis of the conversation, a monitor will make suggestions or recommendations to improve the quality of the customer interaction.

Accordingly, there is a need in customer relationship management ("CRM") for an objective tool useful in improving the quality of customer interactions with agents and ultimately customer relationships. In particular, a need exists for an objective monitoring and analysis tool which provides information about a customer's perception of an interaction during a call. In the past, post-call data collection methods have been used to survey callers for feedback. This feedback may be subsequently used by a supervisor or trainer to evaluate an agent. Although such surveys have enjoyed some degree of success, their usefulness is directly tied to a customer's willingness to provide post-call data.

More "passive" methods have also been employed to collect data relating to a customer's in-call experience. For example, U.S. Pat. No. 6,724,887 to Eilbacher, et al. is directed to a method and system for analyzing a customer communication with a contact center. According to Eilbacher, a contact center may include a monitoring system which records customer communications and a customer experience analyzing unit which reviews the customer communications. The customer experience analyzing unit identifies at least one parameter of the customer communications and automatically determines whether the identified parameter of the customer communications indicates a negative or unsatisfactory experience. According to Eilbacher, a stress analysis may be performed on audio telephone calls to determine a stress parameter by processing the audio portions of the telephone calls. From this, it can then be determined whether the customer experience of the caller was satisfactory or unsatisfactory.

While the method of Eilbacher provides some benefit with respect to reaching an ultimate conclusion as to whether a customer's experience was satisfactory or unsatisfactory, the method provides little insight into the reasons for an experiential outcome. As such, the method of Eilbacher provides only limited value in training agents for future customer communications. Accordingly, there exists a need for a system that analyzes the underlying behavioral characteristics of a customer and agent so that data relating to these behavioral characteristics can be used for subsequent analysis and training.

Systems such as stress analysis systems, spectral analysis models and wordspotting models also exist for determining certain characteristics of audible sounds associated with a communication. For example, systems such as those disclosed in U.S. Pat. No. 6,480,826 to Pertrushin provide a system and method for determining emotions in a voice signal. However, like Eilbacher, these systems also provide only limited value in training customer service agents for future customer interactions. Moreover, such methods have limited statistical accuracy in determining stimuli for events occurring throughout an interaction.

It is well known that certain psychological behavioral models have been developed as tools to evaluate and understand how and/or why one person or a group of people interacts with another person or group of people. The Process Communication Model® ("PCM") developed by Dr. Taibi Kahler is an example of one such behavioral model. Specifically, PCM presupposes that all people fall primarily into one of six basic personality types: Reactor, Workaholic, Persister, Dreamer, Rebel and Promoter. Although each person is one of these six types, all people have parts of all six types within them arranged like a "six-tier configuration." Each of the six types learns differently, is motivated differently, communicates differently, and has a different sequence of negative behaviors in which they engage when they are in distress. Importantly each PCM personality type responds positively or negatively to communications that include tones or messages commonly associated with another of the PCM personality types. Thus, an understanding of a communicant's PCM personality type offers guidance as to an appropriate responsive tone or message. There exists a need for a system and method that analyzes the underlying behavioral characteristics of a customer and agent communication by automatically applying a psychological behavioral model such as, for example PCM, to the communication.

Devices and software for recording and logging calls to a call center are well known. However, application of wordspotting analytical tools to recorded audio communications can pose problems. Devices and software that convert recorded or unrecorded audio signals to text files are also known the art. But, translation of audio signals to text files often results in lost voice data due to necessary conditioning and/or compression of the audio signal. Accordingly, a need also exists to provide a system that allows a contact center to capture audio signals and telephony events with sufficient clarity to accurately apply a linguistic-based psychological behavioral analytic tool to a telephonic communication.

The present invention is provided to solve the problems discussed above and other problems, and to provide advantages and aspects not previously provided. A full discussion of the features and advantages of the present invention is deferred to the following detailed description, which proceeds with reference to the accompanying drawings.

SUMMARY OF THE INVENTION

According to the present invention, a method for analyzing a telephonic communication between a customer and a contact center is provided. According to the method, a telephonic communication is separated into at least first constituent voice data and second constituent voice data. One of the first and second constituent voice data is analyzed by mining the voice data and applying a predetermined linguistic-based psychological behavioral model to one of the separated first and second constituent voice data. Behavioral assessment data is generated which corresponds to the analyzed voice data.

According to another aspect of the present invention, the telephonic communication is received in digital format. The step of separating the communication into at least a first and second constituent voice data comprises the steps of identifying a communication protocol associated with the telephonic communication, and recording the telephonic communication to a first electronic data file. The first electronic data file is comprised of a first and second audio track. The first constituent voice data is automatically recorded on the first audio track based on the identified communication protocol, and the second constituent voice data is automatically recorded on the second audio track based on the identified communication protocol. At least one of the first and second constituent voice data recorded on the corresponding first and second track is separated from the first electronic data file. It is also contemplated that two first data files can be created, wherein the first audio track is recorded to one of the first data file and the second audio track is recorded to the other first data file.

According to another aspect of the present invention, the method described above further comprises the step of generating a text file before the analyzing step. The text file includes a textual translation of either or both of the first and second constituent voice data. The analysis is then performed on the translated constituent voice data in the text file.

According to another aspect of the present invention, the predetermined linguistic-based psychological behavioral model is adapted to assess distress levels in a communication. Accordingly, the method further comprises the step of generating distress assessment data corresponding to the analyzed second constituent voice data.

According to yet another aspect of the present invention event data is generated. The event data corresponds to at least one identifying indicia and time interval. The event data includes at least one of behavioral assessment data or distress assessment data. It is also contemplated that both behavioral assessment data and distress assessment data are included in the event data.

According to still another aspect of the present invention, the telephonic communication is one of a plurality of telephonic communications. Accordingly, the method further comprises the step of categorizing the telephonic communication as one of a plurality of call types and/or customer categories. The telephonic communication to be analyzed is selected from the plurality of telephonic communications based upon the call type and/or the customer category in which the telephonic communication is categorized.

According to still another aspect of the present invention, a responsive communication to the telephonic communication is automatically generated based on the event data generated as a result of the analysis.

According to another aspect of the present invention, a computer program for analyzing a telephonic communication is provided. The computer program is embodied on a computer readable storage medium adapted to control a computer. The computer program comprises a plurality of code segments for performing the analysis of the telephonic communication. In particular, a code segment separates a telephonic communication into first constituent voice data and second constituent voice data. The computer program also has a code segment that analyzes one of the first and second voice data by applying a predetermined psychological behavioral model to one of the separated first and second constituent voice data. And, a code segment is provided for generating behavioral assessment data corresponding to the analyzed constituent voice data.

According to yet another aspect of the present invention, the computer program comprises a code segment for receiving a telephonic communication in digital format. The telephonic communication is comprised of a first constituent voice data and a second constituent voice data. A code segment identifies a communication protocol associated with the telephonic communication. A code segment is provided for separating the first and second constituent voice data one from the other by recording the telephonic communication in stereo format to a first electronic data file. The first electronic data file includes a first and second audio track. The first constituent voice data is automatically recorded on the first audio track based on the identified communication protocol, and the second constituent voice data is automatically recorded on the second audio track based on the identified communication protocol.

A code segment applies a non-linguistic based analytic tool to the separated first constituent voice data and generates phone event data corresponding to the analyzed first constituent voice data. A code segment is provided for translating the first constituent voice data into text format and storing the translated first voice data in a first text file. A code segment analyzes the first text file by mining the text file and applying a predetermined linguistic-based psychological behavioral model to the text file. Either or both of behavioral assessment data and distress assessment data corresponding to the analyzed first voice data is generated therefrom.

According to another aspect of the present invention, the above analysis is performed on the second constituent voice data. Additionally, a code segment is provided for generating call assessment data by comparatively analyzing the behavioral assessment data and distress assessment data corresponding to the analyzed first voice data and the behavioral assessment data and distress assessment data corresponding to the analyzed second voice data. The computer program has a code segment for outputting event data which is comprised of call assessment data corresponding to at least one identifying indicia and at least one predetermined time interval.

According to still another aspect of the present invention, a method for analyzing an electronic communication is provided. The method comprises the step of receiving an electronic communication in digital format. The electronic communication includes communication data. The communication data is analyzed by applying a predetermined linguistic-based psychological behavioral model thereto. Behavioral assessment data corresponding to the analyzed communication data is generated therefrom.

The method described can be embodied in a computer program stored on a computer readable media. The a computer program would include code segments or routines to enable all of the functional aspects of the interface described or shown herein.

According to still another aspect of the present invention, the computer program further comprises a code segment for generating a graphical user interface ("GUI"). The GUI is adapted to display a first field for enabling identification of customer interaction event information on a display. The customer interaction event information includes call assessment data based on the psychological behavioral model applied to the analyzed constituent voice data of each customer interaction event. The computer program also includes a code segment for receiving input from a user for identifying at least a first customer interaction event. A code segment is also provided for displaying the customer interaction event information for the first customer interaction event.

According to one aspect of the present invention, the GUI enables a user of the system to locate one or more caller interaction events (i.e., calls between a caller and the call center), and to display information relating to the event. In particular, the graphical user interface provides a visual field showing the results of the psychological behavioral model that was applied to a separated voice data from the caller interaction event. Moreover, the interface can include a link to an audio file of a selected caller interaction event, and a visual representation that tracks the portion of the caller interaction that is currently heard as the audio file is being played.

According to one aspect of the invention, the graphical user interface is incorporated in a system for identifying one or more caller interaction events and displaying a psychological behavioral model applied to a separated voice data of a customer interaction event. The system comprises a computer coupled to a display and to a database of caller interaction event information. The caller interaction event information includes data resulting from application of a psychological behavioral model to a first voice data separated from an audio wave form of a caller interaction event. Additionally, the caller event information can also include additional information concerning each call, such as statistical data relating to the caller interaction event (e.g., time, date and length of call, caller identification, agent identification, hold times, transfers, etc.), and a recording of the caller interaction event.

The system also includes a processor, either at the user's computer or at another computer, such as a central server available over a network connection, for generating a graphical user interface on the display. The graphical user interface comprises a selection visual field for enabling user input of caller interaction event parameters for selection of at least a first caller interaction event and/or a plurality of caller interaction events. The caller interaction event parameters can include one or more caller interaction event identifying characteristic. These characteristics can include, for example, the caller's name or other identification information, a date range, the agent's name, the call center identification, a supervisor identifier, etc. For example, the graphical user interface can enable a user to select all caller interaction events for a particular caller; or all calls handled by a particular agent. Both examples can be narrowed to cover a specified time period or interval. The interface will display a selected caller interaction event field which provides identification of caller interaction events corresponding to the user input of caller interaction event parameters.

The graphical user interface also includes a conversation visual field for displaying a time-based representation of characteristics of the caller interaction event(s) based on the psychological behavioral model. These characteristics were generated by the application of a psychological behavioral model to a first voice data separated from an audio wave form of a caller interaction event which is stored as part of the caller interaction event information.

The conversation visual field can include a visual link to an audio file of the caller interaction event(s). Additionally, it may also include a graphical representation of the progress of the first caller interaction event that corresponds to a portion of the audio file being played. For example, the interface may show a line representing the call and a moving pointer marking the position on the line corresponding to the portion of the event being played. Additionally, the time-based representation of characteristics of the caller interaction event can include graphical or visual characteristic elements which are also displayed in the conversation visual field. Moreover, the characteristic elements are located, or have pointers to, specific locations of the graphical representation of the progress of the event corresponding to where the element was generated by the analysis.

The graphical user interface further includes a call statistics visual field selectable by a user for displaying statistics pertaining to the caller interaction events. The statistics in the call statistics visual field can include, for example: call duration, caller talk time, agent talk time, a caller satisfaction score, an indication of the number of silences greater than a predetermined time period, and an agent satisfaction score.

The graphical user interface can also include a number of other visual fields. For example, the graphical user interface can include a caller satisfaction report field for displaying one or more caller satisfaction reports, or a user note field for enabling a user of the system to place a note with the first caller interaction event.

In accordance with another embodiment of the invention, a method for identifying one or more caller interaction events and displaying an analysis of a psychological behavioral model applied to a separated voice data from the caller interaction event comprises providing a graphical user interface for displaying a first field for enabling identification of caller interaction event information on a display, the caller interaction event information including analysis data based on a psychological behavioral model applied to a first separated voice data of each caller interaction event; receiving input from a user for identifying at least a first caller interaction event; and, displaying the caller interaction event information for the first caller interaction event on the display. The step of receiving input from a user can include receiving at least one or more of a caller identifier, a call center identifier, an agent identifier, a supervisor identifier, and a date range.

The step of displaying the caller interaction event information for the first caller interaction event on the display can include displaying a time-based representation of characteristics of the first caller interaction event based on the psychological behavioral model. The method can also include providing an audio file of the first caller interaction event. In this regard, the displaying of the time-based representation of characteristics of the first caller event based on the psychological behavioral model can include displaying a graphical representation of the progress of the first caller interaction event that corresponds to a portion of the audio file being played.

The graphical user interface can be generated by a user's local computer, or from a remote server coupled to the user's computer via a network connection. In this latter instance, the method can further include creating a web page containing the graphical user interface that is downloadable to a user's computer, and downloading the page via the network connection.

The method can include providing other visual fields for enabling other functions of the system. For example, the method can include providing a field in the graphical user interface for enabling a user to place a note with the information for the first caller interaction event.

The graphical user interface described can be embodied in a computer program stored on a computer readable media. The computer program would include code segments or routines to enable all of the functional aspects of the interface described or shown herein.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 12 is. a flow chart illustrating the process of analyzing separated constituent voice data of a telephonic communication in accordance with the present invention;

FIG. 13 is a flow chart illustrating the process of analyzing separated constituent voice data of a telephonic communication in accordance with the present invention; and, FIGS. 14-32 are graphical user interface screens of the resultant output from the process of analyzing voice data of a telephonic communication in accordance with the present invention.

DETAILED DESCRIPTION

Figure 1:
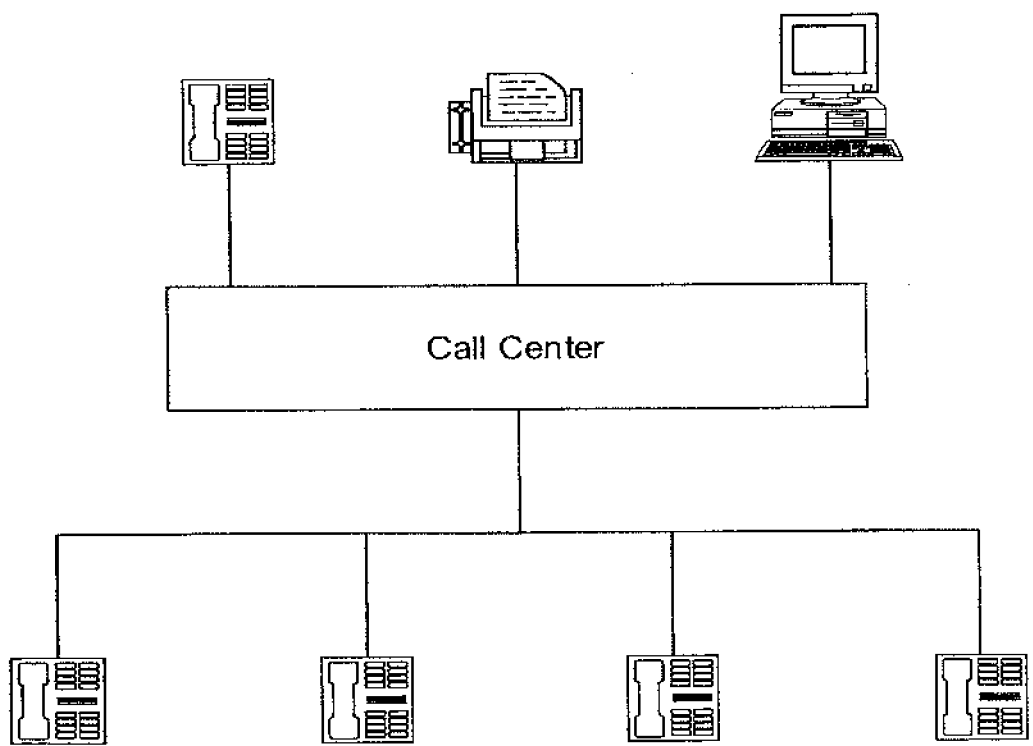
FIG. 1 is a block diagram of call center.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIGS. 1-32, a method and system for analyzing an electronic communication between a customer and a contact center is provided. A "contact center" as used herein can include any facility or system server suitable for receiving and recording electronic communications from customers. Such communications can include, for example, telephone calls, facsimile transmissions, e-mails, web interactions, voice over IP ("VoIP") and video. It is contemplated that these communications may be transmitted by and through any type of telecommunication device and over any medium suitable for carrying data. For example, the communications may be transmitted by or through telephone lines, cable or wireless communications. As shown in FIG. 1, The contact center 10 of the present invention is adapted to receive and record varying electronic communications 11 and data formats that represent an interaction that may occur between a customer (or caller) 7 and a contact center agent 9 during fulfillment of a customer/agent transaction.

Figure 2:
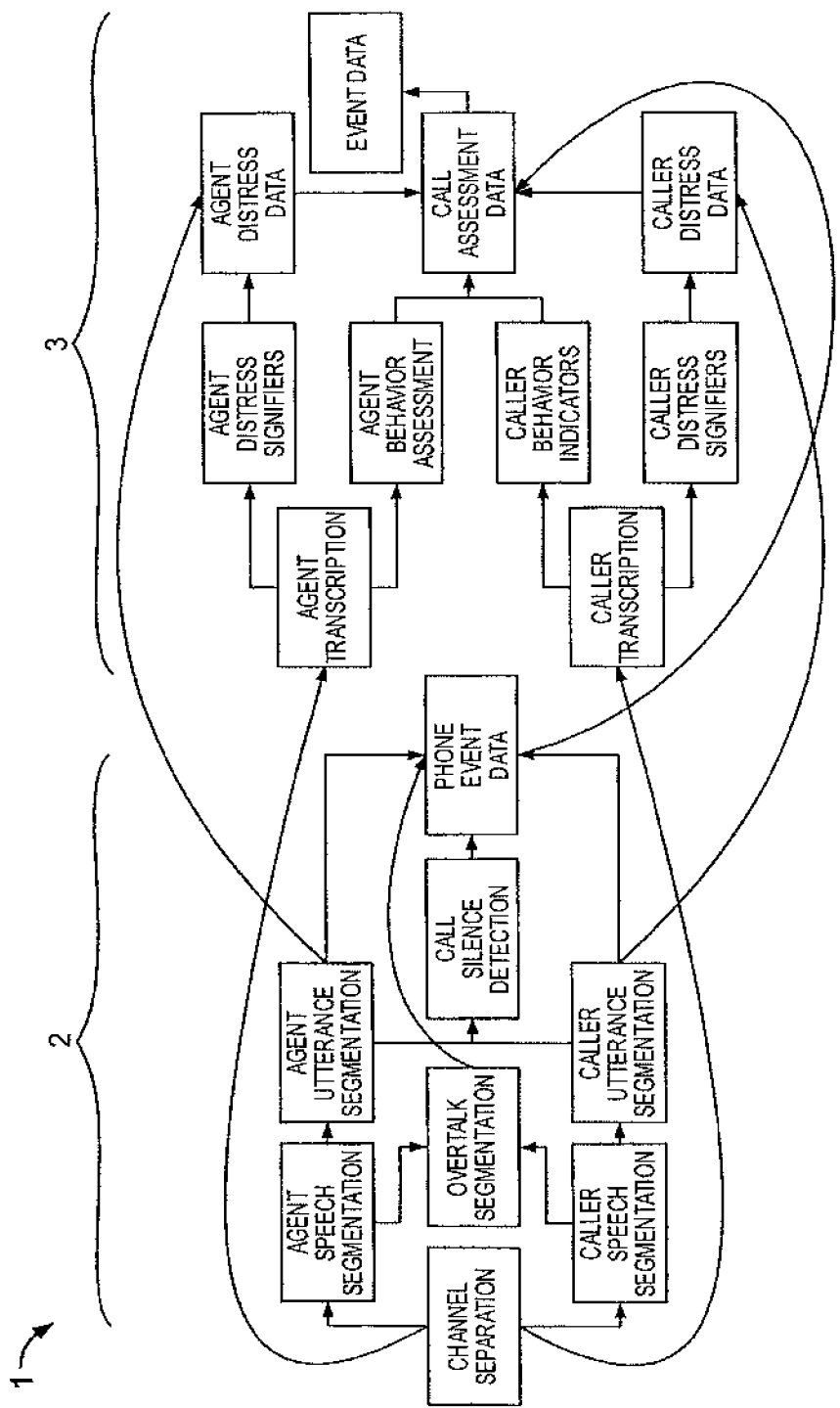
FIG. 2 is a block diagram of the recording engine and behavioral analysis engine according to the present invention.

As shown in FIG. 2, the present method and system for analyzing an electronic communication between a customer 7 and a contact center 10 comprises a recording engine 2 and a behavioral analysis engine 3. As will be described in further detail, an audio communication signal is recorded, separated into constituent audio data, and analyzed in accordance with the methods described below. It is contemplated that the method for analyzing an electronic communication between a customer 7 and a contact center 10 of the present invention can be implemented by a computer program. Now is described in more specific terms, the computer hardware associated with operating the computer program that may be used in connection with the present invention.

Process descriptions or blocks in figures should be understood as representing modules, segments, or portions of code which include one or more executable instructions for implementing specific logical functions or steps in the process. Alternate implementations are included within the scope of the embodiments of the present invention in which functions may be executed out of order from that shown or discussed, including substantially concurrently or in reverse order, depending on the functionality involved, as would be understood by those having ordinary skill in the art.

Figure 3:
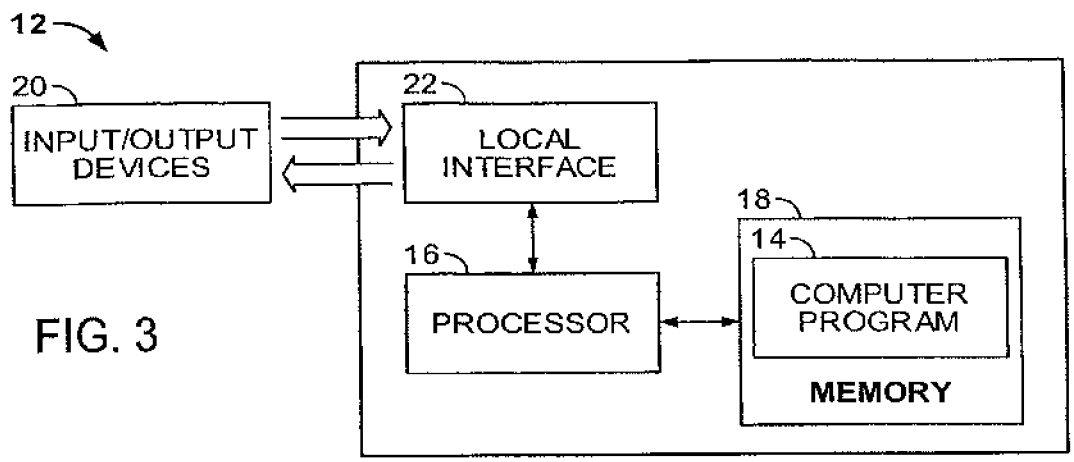
FIG. 3 is a block diagram of a computer used in connection with the present invention.

FIG. 3 is a block diagram of a computer or server 12. For purposes of understanding the hardware as described herein, the terms "computer" and "server" have identical meanings and are interchangeably used. Computer 12 includes control system 14. The control system 14 of the invention can be implemented in software (e.g., firmware), hardware, or a combination thereof. In the currently contemplated best mode, the control system 14 is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. An example of a general purpose computer that can implement the control system 14 of the present invention is shown in FIG. 3. The control system 14 may reside in, or have portions residing in, any computer such as, but not limited to, a general purpose personal computer.

Therefore, computer 12 of FIG. 3 may be representative of any computer in which the control system 14 resides or partially resides.

Generally, in terms of hardware architecture, as shown in FIG. 3, the computer 12 includes a processor 16, memory 18, and one or more input and/or output (I/O) devices 20 (or peripherals) that are communicatively coupled via a local interface 22. The local interface 22 can be, for example, but not limited to, one or more buses or other wired or wireless connections, as is known in the art. The local interface 22 may have additional elements, which are omitted for simplicity, such as controllers, buffers (caches), drivers, repeaters, and receivers, to enable communications. Further, the local interface may include address, control, and/or data connections to enable appropriate communications among the other computer components.

The processor 16 is a hardware device for executing software, particularly software stored in memory 18. The processor 16 can be any custom made or commercially available processor, a central processing unit (CPU), an auxiliary processor among several processors associated with the computer 12, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80.times.8 or Pentium series microprocessor from Intel Corporation, a PowerPC microprocessor from IBM, a Sparc microprocessor from Sun Microsystems, Inc., or a 8xxx series microprocessor from Motorola Corporation.

The memory 18 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory 18 may incorporate electronic, magnetic, optical, and/or other types of storage media. The memory 18 can have a distributed architecture where various components are situated remote from one another, but can be accessed by the processor 16.

The software in memory 18 may include one or more separate programs, each of which comprises an ordered listing of executable instructions for implementing logical functions. In the example of FIG. 3, the software in the memory 18 includes the control system 14 in accordance with the present invention and a suitable operating system (O/S) 24. A non-exhaustive list of examples of suitable commercially available operating systems 24 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). The operating system 24 essentially controls the execution of other computer programs, such as the control system 14, and provides scheduling, input-output control, file and data management, memory management, and communication control and related services.

The control system 14 may be a source program, executable program (object code), script, or any other entity comprising a set of instructions to be performed. When a source program, the program needs to be translated via a compiler, assembler, interpreter, or the like, which may or may not be included within the memory 18, so as to operate properly in connection with the O/S 24. Furthermore, the control system 14 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada. In one embodiment, the control system 14 is written in C++. The I/O devices 20 may include input devices, for example but not limited to, a keyboard, mouse, scanner, microphone, touch screens, interfaces for various medical devices, bar code readers, stylus, laser readers, radio-frequency device readers, etc. Furthermore, the I/O devices 20 may also include output devices, for example but not limited to, a printer, bar code printers, displays, etc. Finally, the I/O devices 20 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 12 is a PC, workstation, PDA, or the like, the software in the memory 18 may further include a basic input output system (BIOS) (not shown in FIG. 3). The BIOS is a set of software routines that initialize and test hardware at startup, start the O/S 24, and support the transfer of data among the hardware devices. The BIOS is stored in ROM so that the BIOS can be executed when the computer 12 is activated.

When the computer 12 is in operation, the processor 16 is configured to execute software stored within the memory 18, to communicate data to and from the memory 18, and to generally control operations of the computer 12 pursuant to the software. The control system 14 and the O/S 24, in whole or in part, but typically the latter, are read by the processor 16, perhaps buffered within the processor 16, and then executed.

When the control system 14 is implemented in software, as is shown in FIG. 3, it should be noted that the control system 14 can be stored on any computer readable medium for use by or in connection with any computer related system or method. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. The control system 14 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In another embodiment, where the control system 14 is implemented in hardware, the control system 14 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
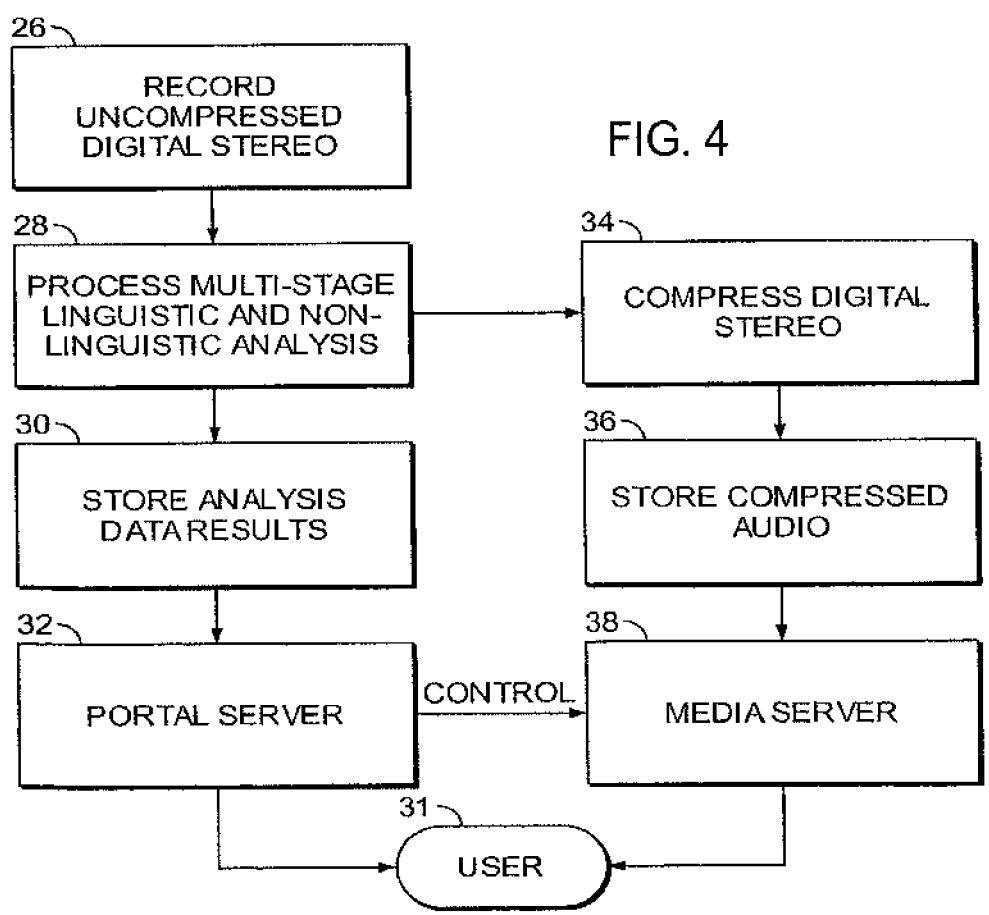
FIG. 4 is a flow chart illustrating the process of analyzing a telephonic communication in accordance with the present invention.
Figure 5:
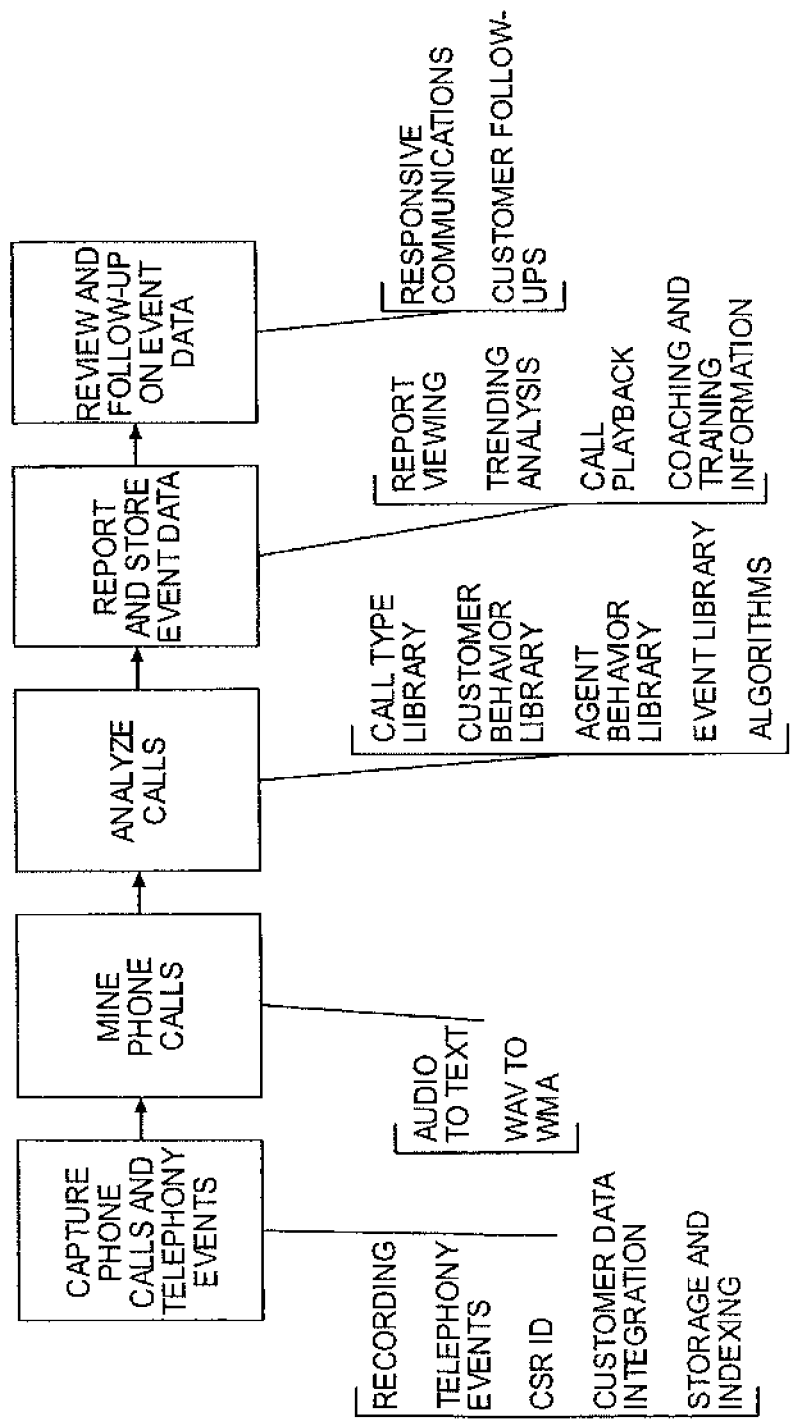
FIG. 5 is a flow chart illustrating the process of analyzing a telephonic communication in accordance with the present invention.

FIG. 4 illustrates the general flow of the present method. As shown, an uncompressed digital stereo audio waveform of a conversation between a customer and a call center agent is recorded and separated into customer voice data and call center agent voice data 26. The voice data associated with the audio waveform is then mined and analyzed using multi-stage linguistic and non-linguistic analytic tools 28. The analysis data is stored 30 and can be accessed by a user 31 (e.g., CSR supervisor) through an interface portal 32 for subsequent review 32. The digital stereo audio waveform is compressed 34 and stored 36 in an audio file which is held on a media server 38 for subsequent access through the interface portal 32.

The method of the present invention is configured to postpone audio compression until analysis of the audio data is complete. This delay allows the system to apply the analytic tools to a truer and clearer hi-fidelity signal. The system employed in connection with the present invention also minimizes audio distortion, increases fidelity, eliminates gain control and requires no additional filtering of the signal.

Figure 6:
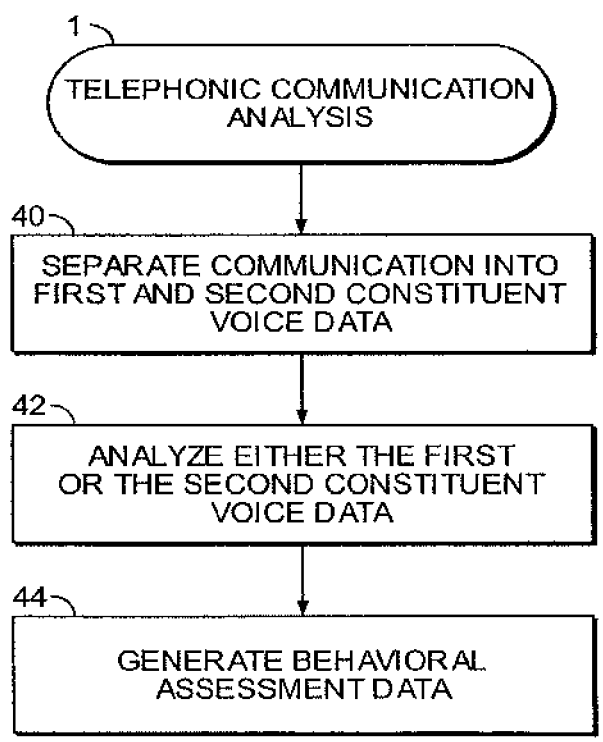
FIG. 6 is a flow chart illustrating the process of analyzing a telephonic communication in accordance with the present invention.

As shown in FIG. 6, the method of the present invention more specifically comprises the step of separating a telephonic communication 2 into first constituent voice data and second constituent voice data 40. One of the first or second constituent voice data is then separately analyzed by applying a predetermined psychological behavioral model thereto 42 to generate behavioral assessment data 44. In one embodiment discussed in detail below, linguistic-based behavioral models are adapted to assess behavior based on behavioral signifiers within a communications are employed. It is contemplated that one or more psychological behavioral models may be applied to the voice data to generate behavioral assessment data therefrom.

The telephonic communication 2 being analyzed can be one of numerous calls stored within a contact center server 12, or communicated to a contact center during a given time period. Accordingly, the present method contemplates that the telephonic communication 2 being subjected to analysis is selected from the plurality of telephonic communications. The selection criteria for determining which communication should be analyzed may vary. For example, the communications coming into a contact center can be automatically categorized into a plurality of call types using an appropriate algorithm. For example, the system may employ a word-spotting algorithm that categorizes communications 2 into particular types or categories based on words used in the communication. In one embodiment, each communication 2 is automatically categorized as a service call type (e.g., a caller requesting assistance for servicing a previously purchased product), a retention call type (e.g., a caller expressing indignation, or having a significant life change event), or a sales call type (e.g., a caller purchasing an item offered by a seller). In one scenario, it may be desirable to analyze all of the "sales call type" communications received by a contact center during a predetermined time frame. In that case, the user would analyze each of the sales call type communications from that time period by applying the predetermined psychological behavioral model to each such communication.

Alternatively, the communications 2 may be grouped according to customer categories, and the user may desire to analyze the communications 2 between the call center and communicants within a particular customer category. For example, it may be desirable for a user to perform an analysis only of a "platinum customers" category, consisting of high end investors, or a "high volume distributors" category comprised of a user's best distributors.

In one embodiment the telephonic communication 2 is a telephone call in which a telephonic signal is transmitted. As may be seen in FIGS. 7 and 8, a customer sending a telephonic signal may access a contact center 10 through the public switched telephone network (PSTN) 203 and an automatic call distribution system (PBX/ACD) 205 directs the communication to one of a plurality of agent work stations 211, 213. Each agent work station 211, 213 includes, for example, a computer 215 and a telephone 213.

When analyzing voice data, it is preferable to work from a true and clear hi-fidelity signal. This is true both in instances in which the voice data is being translated into a text format for analysis using a linguistic-based psychological behavioral model thereto, or in instances in which a linguistic-based psychological behavioral model is being applied directly to an audio waveform, audio stream or file containing voice data.

Figure 7:
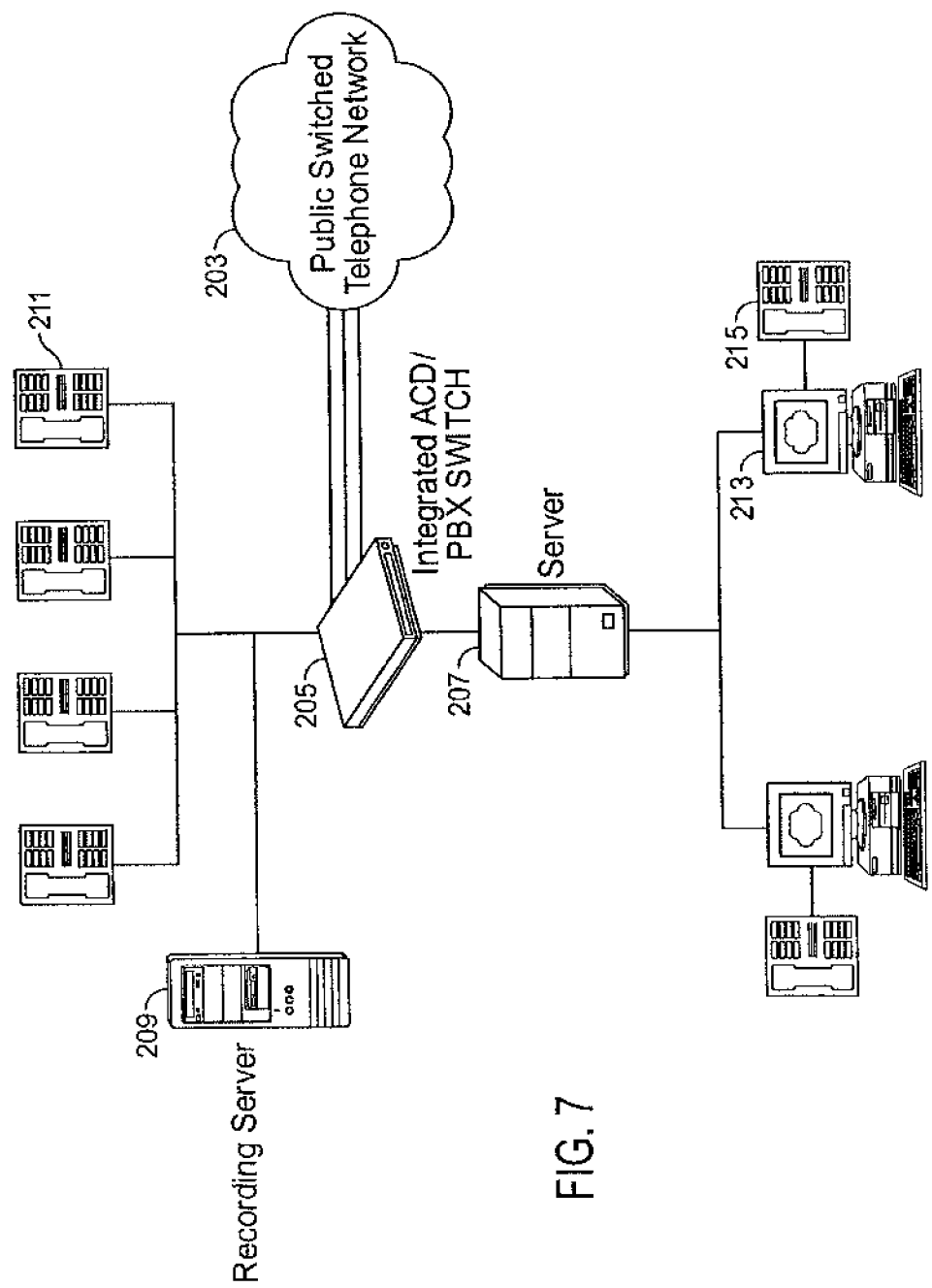
FIG. 7 is a block diagram of a telephonic communication system according to the present invention.

FIG. 7 illustrates a telephonic communication system 201, such as a distributed private branch exchange (PBX), having a public switched telephone network (PSTN) 203 connected to the PBX through a PBX switch 205.

The PBX switch 205 provides an interface between the PSTN 203 and a local network. Preferably, the interface is controlled by software stored on a telephony server 207 coupled to the PBX switch 205. The PBX switch 205, using interface software, connects trunk and line station interfaces of the public switch telephone network 203 to stations of a local network or other peripheral devices contemplated by one skilled in the art. Further, in another embodiment, the PBX switch may be integrated within telephony server 207. The stations may include various types of communication devices connected to the network, including the telephony server 207, a recording server 209, telephone stations 211, and client personal computers 213 equipped with telephone stations 215. The local network may further include fax machines and modems.

Generally, in terms of hardware architecture, the telephony server 207 includes a processor, memory, and one or more input and/or output (I/O) devices (or peripherals) that are communicatively coupled via a local interface. The processor can be any custom-made or commercially available processor, a central processing unit (CPU), an auxiliary processor among several processors associated with the telephony server 207, a semiconductor based microprocessor (in the form of a microchip or chip set), a macroprocessor, or generally any device for executing software instructions. The memory of the telephony server 207 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). The telephony server 207 may further include a keyboard and a mouse for control purposes, and an attached graphic monitor for observation of software operation.

The telephony server 207 incorporates PBX control software to control the initiation and termination of connections between stations and via outside trunk connections to the PSTN 203. In addition, the software may monitor the status of all telephone stations 211 in real-time on the network and may be capable of responding to telephony events to provide traditional telephone service. This may include the control and generation of the conventional signaling tones such as dial tones, busy tones, ring back tones, as well as the connection and termination of media streams between telephones on the local network. Further, the PBX control software may use a multi-port module 223 and PCs to implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

Figure 9:
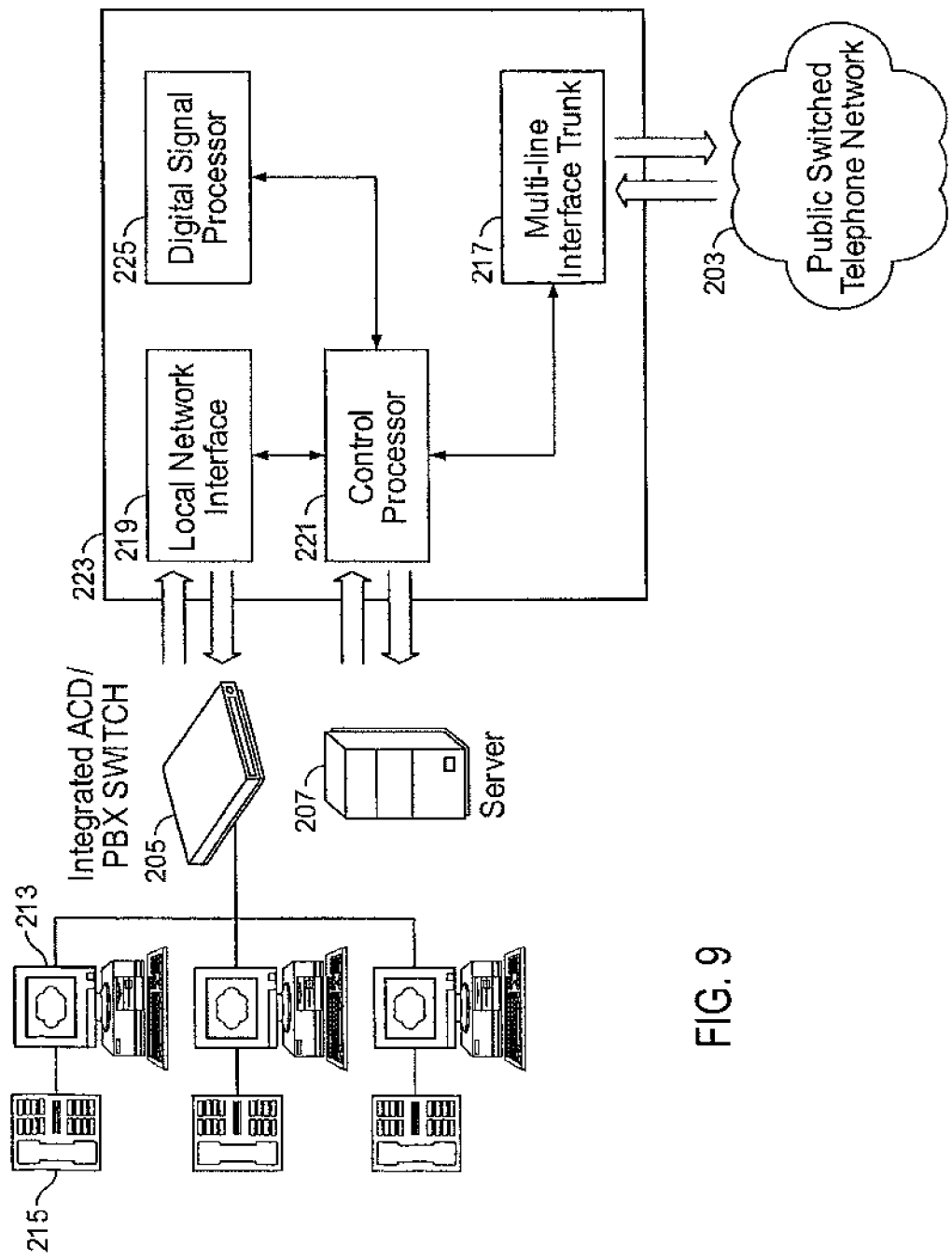
FIG. 9 is a block diagram of a telephonic communication system with a multi-port PSTN module according to the present invention.

Referring to FIG. 9, in one embodiment, the telephony server 207 is equipped with multi-port PSTN module 223 having circuitry and software to implement a trunk interface 217 and a local network interface 219. The PSTN module 223 comprises a control processor 221 to manage the transmission and reception of network messages between the PBX switch 205 and the telephony network server 207. The control processor 221 is also capable of directing network messages between the PBX switch 205, the local network interface 291, the telephony network server 207, and the trunk interface 217. In the one embodiment, the local network uses Transmission Control Protocol/Internet Protocol (TCP/IP). The network messages may contain computer data, telephony transmission supervision, signaling and various media streams, such as audio data and video data. The control processor 221 directs network messages containing computer data from the PBX switch 205 to the telephony network server 207 directly through the multi-port PSTN module 223.

The control processor 221 may include buffer storage and control logic to convert media streams from one format to another, if necessary, between the trunk interface 217 and local network. The trunk interface 217 provides interconnection with the trunk circuits of the PSTN 203. The local network interface 219 provides conventional software and circuitry to enable the telephony server 207 to access the local network. The buffer RAM and control logic implement efficient transfer of media streams between the trunk interface 217, the telephony server 207, the digital signal processor 225, and the local network interface 219.

The trunk interface 217 utilizes conventional telephony trunk transmission supervision and signaling protocols required to interface with the outside trunk circuits from the PSTN 203. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The control processor 221 manages real-time telephony event handling pertaining to the telephone trunk line interfaces, including managing the efficient use of digital signal processor resources for the detection of caller ID, DTMF, call progress and other conventional forms of signaling found on trunk lines. The control processor 221 also manages the generation of telephony tones for dialing and other purposes, and controls the connection state, impedance matching, and echo cancellation of individual trunk line interfaces on the multi-port PSTN module 223.

Preferably, conventional PBX signaling is utilized between trunk and station, or station and station, such that data is translated into network messages that convey information relating to real-time telephony events on the network, or instructions to the network adapters of the stations to generate the appropriate signals and behavior to support normal voice communication, or instructions to connect voice media streams using standard connections and signaling protocols. Network messages are sent from the control processor 221 to the telephony server 207 to notify the PBX software in the telephony server 207 of real-time telephony events on the attached trunk lines. Network messages are received from the PBX Switch 205 to implement telephone call supervision and may control the set-up and elimination of media streams for voice transmission.

The local network interface 219 includes conventional circuitry to interface with the local network. The specific circuitry is dependent on the signal protocol utilized in the local network. In one embodiment, the local network may be a local area network (LAN) utilizing IP telephony. IP telephony integrates audio and video stream control with legacy telephony functions and may be supported through the H.323 protocol. H.323 is an International Telecommunication Union—Telecommunications protocol used to provide voice and video services over data networks. H.323 permits users to make point-to-point audio and video phone calls over a local area network. IP telephony systems can be integrated with the public telephone system through a local network interface 219, such as an IP/PBX-PSTN gateway, thereby allowing a user to place telephone calls from an enabled computer. For example, a call from an IP telephony client to a conventional telephone would be routed on the LAN to the IP/PBX-PSTN gateway. The IP/PBX-PSTN gateway translates H.323 protocol to conventional telephone protocol and routes the call over the conventional telephone network to its destination. Conversely, an incoming call from the PSTN 203 is routed to the IP/PBX-PSTN gateway and translates the conventional telephone protocol to H.323 protocol.

As noted above, PBX trunk control messages are transmitted from the telephony server 207 to the control processor 221 of the multi-port PSTN. In contrast, network messages containing media streams of digital representations of real-time voice are transmitted between the trunk interface 217 and local network interface 219 using the digital signal processor 225. The digital signal processor 225 may include buffer storage and control logic. Preferably, the buffer storage and control logic implement a first-in-first-out (FIFO) data buffering scheme for transmitting digital representations of voice audio between the local network to the trunk interface 217. It is noted that the digital signal processor 225 may be integrated with the control processor 221 on a single microprocessor.

The digital signal processor 225 may include a coder/decoder (CODEC) connected to the control processor 221. The CODEC may be a type TCM29c13 integrated circuit made by Texas Instruments, Inc. In one embodiment, the digital signal processor 225 receives an analog or digital voice signal from a station within the network or from the trunk lines of the PSTN 203. The CODEC converts the analog voice signal into a digital from, such as digital data packets. It should be noted that the CODEC is not used when connection is made to digital lines and devices. From the CODEC, the digital data is transmitted to the digital signal processor 225 where telephone functions take place. The digital data is then passed to the control processor 221 which accumulates the data bytes from the digital signal processor 225. It is preferred that the data bytes are stored in a first-in-first-out (FIFO)

memory buffer until there is sufficient data for one data packet to be sent according to the particular network protocol of the local network. The specific number of bytes transmitted per data packet depends on network latency requirements as selected by one of ordinary skill in the art. Once a data packet is created, the data packet is sent to the appropriate destination on the local network through the local network interface 219. Among other information, the data packet contains a source address, a destination address, and audio data. The source address identifies the location the audio data originated from and the destination address identifies the location the audio data is to be sent.

The system permits bi-directional communication by implementing a return path allowing data from the local network, through the local network interface 219, to be sent to the PSTN 203 through the multi-line PSTN trunk interface 217. Data streams from the local network are received by the local network interface 219 and translated from the protocol utilized on the local network to the protocol utilized on the PSTN 203. The conversion of data may be performed as the inverse operation of the conversion described above relating to the IP/PBX-PSTN gateway. The data stream is restored in appropriate form suitable for transmission through to either a connected telephone 211, 215 or an interface trunk 217 of the PSTN module 223, or a digital interface such as a T1 line or ISDN. In addition, digital data may be converted to analog data for transmission over the PSTN 203.

Generally, the PBX switch of the present invention may be implemented with hardware or virtually. A hardware PBX has equipment located local to the user of the PBX system. The PBX switch 205 utilized may be a standard PBX manufactured by Avaya, Siemens AG, NEC, Nortel, Toshiba, Fujitsu, Vodavi, Mitel, Ericsson, Panasonic, or InterTel. In contrast, a virtual PBX has equipment located at a central telephone service provider and delivers the PBX as a service over the PSTN 203.

As illustrated in FIG. 1, the system includes a recording server 209 for recording and separating network messages transmitted within the system. The recording server 209 may be connected to a port on the local network, as seen in FIG. 1. Alternatively, the recording server 209 may be connected to the PSTN trunk line as illustrated in FIG. 1A. The recording server 209 includes a control system software, such as recording software. The recording software of the invention can be implemented in software (e.g., firmware), hardware, or a combination thereof. In the currently contemplated best mode, the recording software is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. An example of a general purpose computer that can implement the recording software of the present invention is shown in FIG. 3. The recording software may reside in, or have portions residing in, any computer such as, but not limited to, a general purpose personal computer. Therefore, recording server 209 of FIG. 3 may be representative of any type of computer in which the recording software resides or partially resides.

Generally, hardware architecture is the same as that discussed above and shown in FIG. 3. Specifically, the recording server 209 includes a processor, memory, and one or more input and/or output (I/O) devices (or peripherals) that are communicatively coupled via a local interface as previously described. The local interface can be, for example, but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the other computer components.

As noted above, the recording server 209 incorporates recording software for recording and separating a signal based on the source address and/or destination address of the signal. The method utilized by the recording server 209 depends on the communication protocol utilized on the communication lines to which the recording server 209 is coupled. In the communication system contemplated by the present invention, the signal carrying audio data of a communication between at least two users may be an analog signal or a digital signal in the form of a network message. In one embodiment, the signal is an audio data transmitted according to a signaling protocol, for example the H.323 protocol described above.

Figure 10:
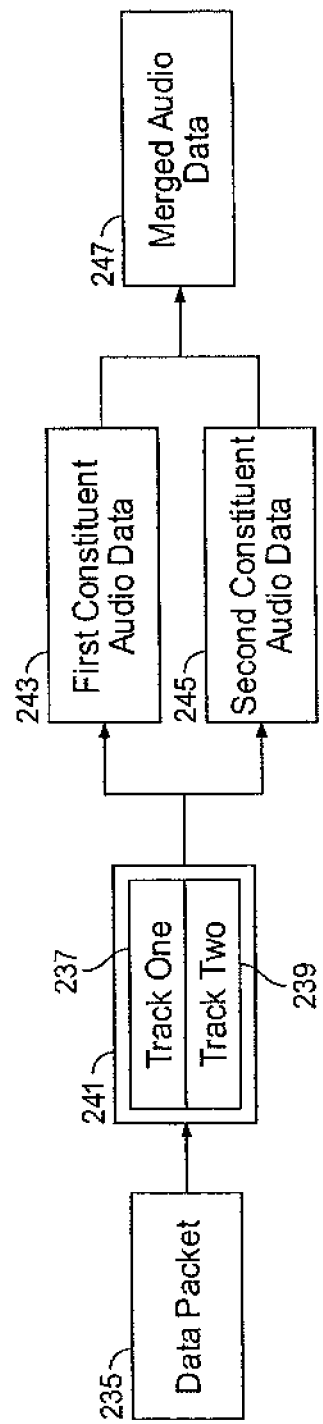
FIG. 10 is a flow chart illustrating the process of recording and separating a telephonic communication in accordance with the present invention.

An example of a communication between an outside caller and a call center agent utilizing the present system 200 is illustrated in FIG. 10 and described herein. In the embodiment of FIG. 10, when an outside caller reaches the system through the multi-line interface trunk 217, their voice signal is digitized (if needed) in the manner described above, and converted into digital data packets 235 according to the communication protocol utilized on the local network of the system. The data packet 235 comprises a source address identifying the address of the outside caller, a destination address identifying the address of the call center agent, and first constituent audio data comprising at least a portion of the outside callers voice. The data packet 235 can further comprise routing data identifying how the data packet 235 should be routed through the system and other relevant data. Once the data packet 235 is created, the data packet 235 is sent to the appropriate destination on the local network, such as to a call center agent, through the local network interface 219. The PBX and/or an automatic call distributor (ACD) can determine the initial communication setup, such as the connection state, impedance matching, and echo cancellation, according to predetermined criteria.

Similar to the process described above, when the call center agent speaks, their voice is digitized (if needed) and converted into digital data packet 235 according to the communication protocol utilized on the local network. The data packet 235 comprises a source address identifying the address of the call center agent, a destination address identifying the address of the outside caller, and second constituent audio data comprising at least a portion of the call center agent's voice. The data packet 235 is received by the local network interface 219 and translated from the communication protocol utilized on the local network to the communication protocol utilized on the PSTN 203. The conversion of data can be performed as described above. The data packet 235 is restored in appropriate form suitable for transmission through to either a connected telephone 211, 215 or a interface trunk 217 of the PSTN module 223, or a digital interface such as a T1 line or ISDN. In addition, digital data can be converted to analog data for transmission through the PSTN 203.

The recording server 209 receives either a data packet 235 comprising: the source address identifying the address of the outside caller, a destination address identifying the address of the call center agent, and the first constituent audio data comprising at least a portion of the outside callers voice; or a data packet 235 comprising a source address identifying the address of the call center agent, a destination address identifying the address of the outside caller, and second constituent audio data comprising at least a portion of the customer's agent voice. It is understood by one of ordinary skill in the art that the recording server 209 is programmed to identify the communication protocol utilized by the local network and extract the audio data within the data packet 235. In one embodiment, the recording server 209 can automatically identify the utilized communication protocol from a plurality of communication protocols. The plurality of communication protocols can be stored in local memory or accessed from a remote database.

The recording server 209 comprises recording software to record the communication session between the outside caller and the call center agent in a single data file in a stereo format. The first data file 241 has at least a first audio track 237 and a second audio track 237. Once a telephone connection is established between an outside caller and a call center agent, the recording software creates a first data file 241 to record the communication between the outside caller and the call center agent. It is contemplated that the entire communication session or a portion of the communication session can be recorded.

Upon receiving the data packet 235, the recording server 209 determines whether to record the audio data contained in the data packet 235 in either the first audio track 237 or the second audio track 239 of the first data file 241 as determined by the source address, destination address, and/or the audio data contained within the received data packet 235. Alternatively, two first data files can be created, wherein the first audio track is recorded to the one of the first data file and the second audio track is recorded to the second first data file. In one embodiment, if the data packet 235 comprises a source address identifying the address of the outside caller, a destination address identifying the address of the call center agent, and first constituent audio data, the first constituent audio data is recorded on the first audio track 237 of the first data file 241. Similarly, if the data packet 235 comprises a source address identifying the address of the call center agent, a destination address identifying the address of the outside caller, and second constituent audio data, the second constituent audio data is recorded on the second audio track 239 of the first data file 241. It should be noted the first and second constituent audio data can be a digital or analog audio waveform or a textual translation of the digital or analog waveform. The recording process is repeated until the communication link between the outside caller and call center agent is terminated.

Figure 8:
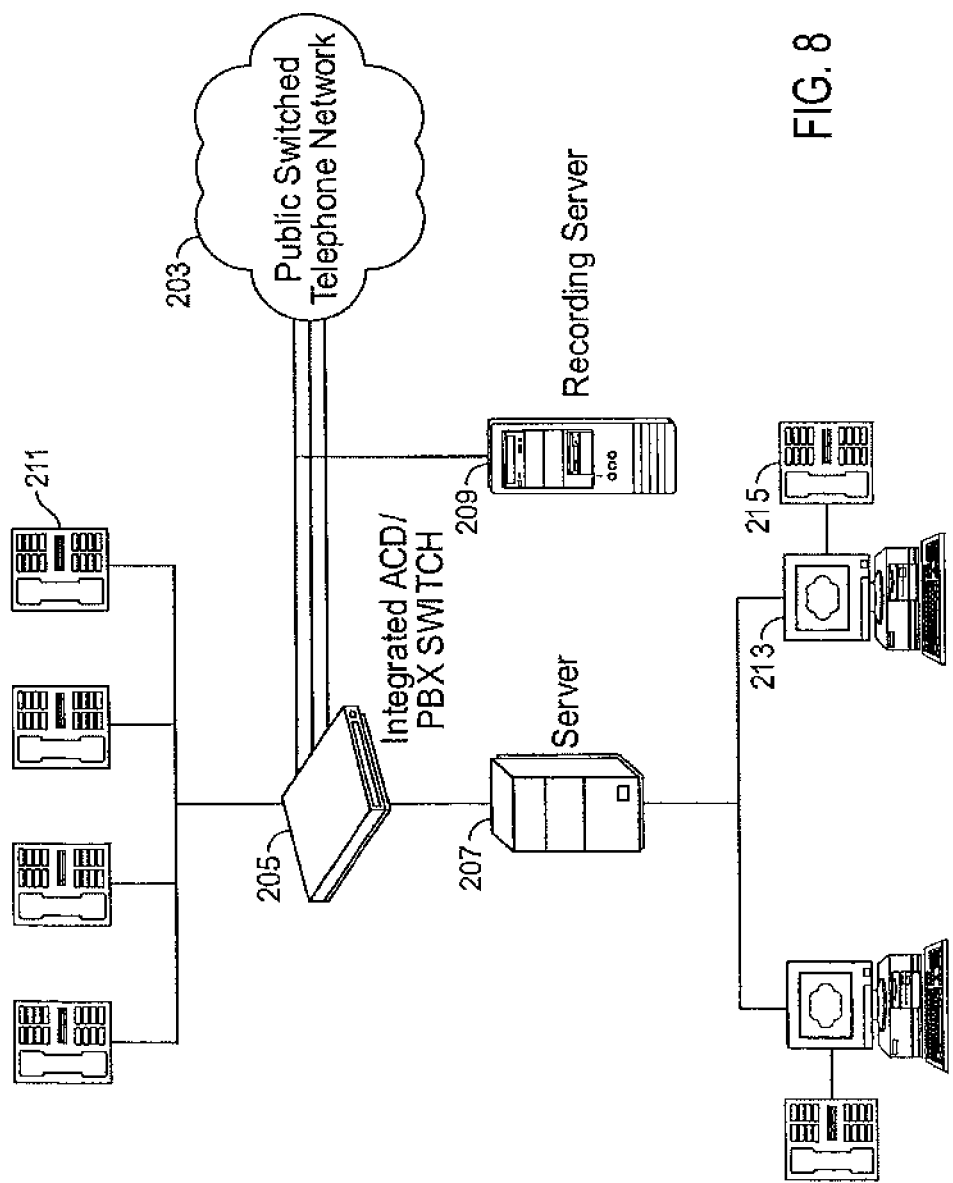
FIG. 8 is a block diagram of a telephonic communication system according to the present invention.

As noted above, the recording server 209 can be connected to the trunk lines of the PSTN 203 as seen in FIG. 8. The PSTN 203 can utilize a different protocol and therefore, the recording server 209 is configured to identify the communication protocol utilized by the PSTN 203, recognize the source and destination address of a signal and extract the audio data from the PSTN 203. The recording server 209 is programmed in a manner as known to one of ordinary skill in the art.

As shown in FIG. 10, once the communication link is terminated, the recording server 209 ends the recording session and stores the single data file having the recorded communication session in memory. After the first data file is stored in memory, the recording server 209 can extract either or both of the first constituent audio data from the first audio track of the first data file or the second constituent audio data from the second audio track of the first data file. In one embodiment, the first constituent audio data extracted from the first audio track is stored in a first constituent data file 243. Similarly, the second constituent audio data extracted from the second audio track can be stored in a second constituent data file 245. The first and second constituent data files 243, 245 can be compressed before being stored in memory. The extracted data can be in the form of a digital or analog audio waveform or can be a textual translation of the first or second constituent audio data. It is contemplated that either or both of the first constituent data file 243 or the second constituent data file 245 can be further analyzed or processed. For example, among other processes and analyses, filtering techniques can be applied to the first constituent data file and/or the second constituent data file. Moreover, event data, such as silence periods or over-talking, can be identified through analysis techniques known to those skilled in the art.

Further, as illustrated in FIG. 10, the first constituent data file 243 and second constituent data file 245 can be merged together into a single second data file 247. The first and second constituent data files can be merged in a stereo format where the first constituent audio data from the first constituent data file 243 is stored on a first audio track of the second data file 247 and the second constituent audio data from the second constituent data file 245 is stored on a second audio track of the second data file 247. Alternatively, the first and second constituent data files can be merged in a mono format where the first constituent audio data from the first constituent data file 243 and the second constituent audio data from the second constituent data file 245 are stored on a first audio track of the second data file 247. Additionally, the first and second constituent audio data can be merged into a document having a textual translation of the audio data. In such a case, identifiers can be associated with each of the merged first and second constituent audio data in order to associate the merged first constituent audio data with the outside caller, and associate the merged second constituent audio data with the call center agent. The second data file 247 can be compressed before being stored in memory.

It is known in the art that "cradle-to-grave" recording may be used to record all information related to a particular telephone call from the time the call enters the contact center to the later of: the caller hanging up or the agent completing the transaction. All of the interactions during the call are recorded, including interaction with an IVR system, time spent on hold, data keyed through the caller's key pad, conversations with the agent, and screens displayed by the agent at his/her station during the transaction.

Figure 11:
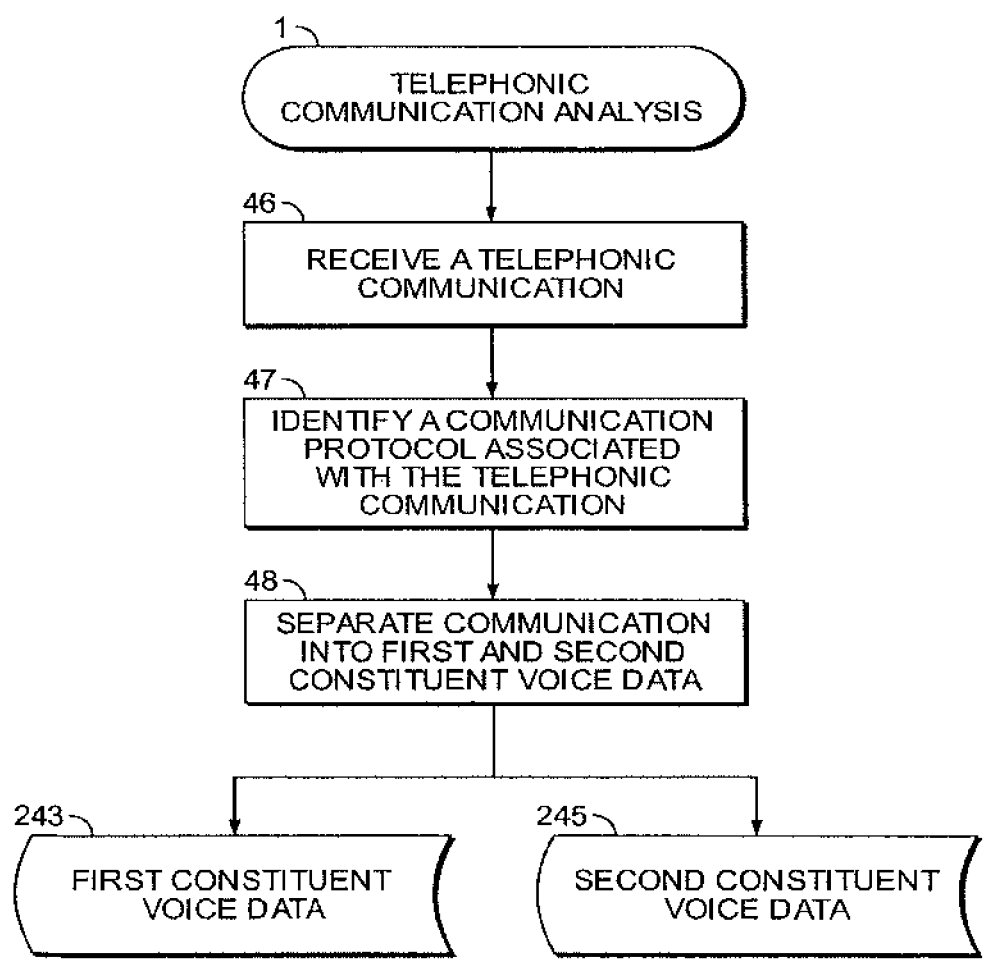
FIG. 11 is a flow chart illustrating the process of recording and separating a telephonic communication in accordance with the present invention.

As shown in FIGS. 11-13, once the first and second constituent voice data are separated one from the other, each of the first and second constituent voice data can be independently mined and analyzed. It will be understood that "mining" as referenced herein is to be considered part of the process of analyzing the constituent voice data. It is also contemplated by the present invention that the mining and behavioral analysis be conducted on either or both of the constituent voice data.

Even with conventional audio mining technology, application of linguistic-based disparities in dialect, phonemes, accents and inflections can impede or render burdensome accurate identification of words. And while it is contemplated by the present invention that mining and analysis in accordance with the present invention can be applied directly to voice data configured in audio format, in a preferred embodiment of the present invention, the voice data to be mined and analyzed is first translated into a text file. It will be understood by those of skill that the translation of audio to text and subsequent data mining may be accomplished by systems known in the art. For example, the method of the present invention may employ software such as that sold under the brand name Audio Mining SDK by Scansoft, Inc., or any other audio mining software suitable for such applications.

As shown in FIGS. 11-13, the separated voice data is mined for behavioral signifiers associated with a linguistic-based psychological behavioral model. In particular, the method of the present invention searches for and identifies text-based keywords (i.e., behavioral signifiers) relevant to a predetermined psychological behavioral model.

According to one embodiment of the present invention, the psychological behavioral model used to analyze the voice data is the Process Communication Model® ("PCM") developed by Dr. Taibi Kahler. PCM is a psychological behavioral analytic tool which presupposes that all people fall primarily into one of six basic personality types: Reactor, Workaholic, Persister, Dreamer, Rebel and Promoter. Although each person is one of these six types, all people have parts of all six types within them arranged like a six-tier configuration. Each of the six types learns differently, is motivated differently, communicates differently, and has a different sequence of negative behaviors they engage in when they are in distress. Importantly, according to PCM, each personality type of PCM responds positively or negatively to communications that include tones or messages commonly associated with another of the PCM personality types. Thus, an understanding of a communicant's PCM personality type offers guidance as to an appropriate responsive tone or message or wording.

According to the PCM Model the following behavioral characteristics are associated with the respective personality types:
TABLE-US-00001 PROCESS COMMUNICATION MODEL (PCM) BEHAVIORAL PERSONALITY TYPE CHARACTERISTICS Reactors compassionate, sensitive, and warm; great "people skills" and enjoy working with groups of people Workaholics responsible, logical, and organized Persisters conscientious, dedicated, and observant; tend to follow the rules and expect others to follow them Dreamers reflective, imaginative, and calm Rebels creative, spontaneous, and playful Promoters resourceful, adaptable, and charming These behavioral characteristics may be categorized by words, tones, gestures, postures and facial expressions, can be observed objectively with significantly high interjudge reliability.

According to one embodiment shown in FIG. 13, the present invention mines significant words within one or both of the separated first and second constituent voice data, and applies PCM to the identified words. For example, the following behavioral signifiers (i.e., words) may be associated with the corresponding behavioral type in the PCM Model:
TABLE-US-00002 PROCESS COMMUNICATION MODEL (PCM) BEHAVIORAL PERSONALITY TYPE SIGNIFIERS Reactors Emotional Words Workaholics Thought Words Persisters Opinion Words Dreamers Reflection Words Rebels Reaction Words Promoters Action Words In another embodiment, the present method mines for such significant words within the merged second data file 247 described above, and apply PCM to the identified words. Alternatively, the first data file 241 can be mined for significant words.

As shown in FIG. 13, when a behavioral signifier is identified within the voice data 62, the identified behavioral signifier is executed against a system database which maintains all of the data related to the psychological behavioral model 66. Based on the behavioral signifiers identified in the analyzed voice data, a predetermined algorithm 64 is used to decipher a linguistic pattern that corresponds to one or more of the PCM personality types 68. More specifically, the present method mines for linguistic indicators (words and phrases) that reveal the underlying personality characteristics of the speaker during periods of distress. Non-linguistic indicators may also be identified to augment or confirm the selection of a style for each segment of speech. Looking at all the speech segments in conjunction with personality information the software determines an order of personality components for the caller by weighing a number of factors such as timing, position, quantity and interaction between the parties in the dialog.

The resultant behavioral assessment data 55 is stored in a database so that it may subsequently be used to comparatively analyze against behavioral assessment data derived from analysis of the other of the first and second constituent voice data 56. The software considers the speech segment patterns of all parties in the dialog as a whole to refine the behavioral and distress assessment data of each party, making sure that the final distress and behavioral results are consistent with patterns that occur in human interaction. Alternatively, the raw behavioral assessment data 55 derived from the analysis of the single voice data may be used to evaluate qualities of a single communicant (e.g., the customer or agent behavioral type, etc.). The results generated by analyzing voice data through application of a psychological behavioral model to one or both of the first and second constituent voice data can be graphically illustrated as discussed in further detail below.

It should be noted that, although one preferred embodiment of the present invention uses PCM as a linguistic-based psychological behavioral model, it is contemplated that any known linguistic-based psychological behavioral model be employed without departing from the present invention. It is also contemplated that more than one linguistic-based psychological behavioral model be used to analyze one or both of the first and second constituent voice data.

In addition to the behavioral assessment of voice data, the method of the present invention may also employ distress analysis to voice data. As may be seen in FIG. 2, linguistic-based distress analysis is preferably conducted on both the textual translation of the voice data and the audio file containing voice data. Accordingly, linguistic-based analytic tools as well as non-linguistic analytic tools may be applied to the audio file. For example, one of skill in the art may apply spectral analysis to the audio file voice data while applying a word spotting analytical tool to the text file. Linguistic-based word spotting analysis and algorithms for identifying distress can be applied to the textual translation of the communication. Preferably, the resultant distress data is stored in a database for subsequent analysis of the communication.

As shown in FIG. 2, it is also often desirable to analyze non-linguistic phone events occurring during the course of a conversation such as hold times, transfers, "dead-air," over-talk, etc. Accordingly, in one embodiment of the present invention, phone event data resulting from analysis of these non-linguistic events is generated. Preferably, the phone event data is generated by analyzing non-linguistic information from both the separated constituent voice data, or from the subsequently generated audio file containing at least some of the remerged audio data of the original audio waveform. It is also contemplated that the phone event data can be generated before the audio waveform is separated.

According to a preferred embodiment of the invention as shown in FIG. 13, both the first and second constituent voice data are mined and analyzed as discussed above 64, 66. The resulting behavioral assessment data 55, phone event data 70 and distress assessment data 72 from each of the analyzed first and second constituent voice data are comparatively analyzed in view of the parameters of the psychological behavioral model to provide an assessment of a given communication.

From this comparative analysis, call assessment data relating to the totality of the call may be generated 56.

Generally, call assessment data is comprised of behavioral assessment data, phone event data and distress assessment data. The resultant call assessment data may be subsequently viewed to provide an objective assessment or rating of the quality, satisfaction or appropriateness of the interaction between an agent and a customer. In the instance in which the first and second constituent voice data are comparatively analyzed, the call assessment data may generate resultant data useful for characterizing the success of the interaction between a customer and an agent.

Thus, as shown in FIGS. 11 and 12, when a computer program is employed according to one embodiment of the present invention, a plurality of code segments are provided. The program comprises a code segment for receiving a digital electronic signal carrying an audio waveform 46. In accordance with the voice separation software described above, a code segment identifies a communication protocol associated with the telephonic signal 47. A code segment is also provided to separate first and second constituent voice data of the communication one from the other by recording the audio waveform in stereo format to a first electronic data file which has a first and second audio track 48. As discussed above, the first constituent voice data is automatically recorded on the first audio track based on the identified communication protocol, and the second constituent voice data is automatically recorded on the second audio track based on the identified communication protocol.

The software also includes a code segment for separately applying a non-linguistic based analytic tool to each of the separated first and second constituent voice data, and to generate phone event data corresponding to the analyzed voice data 50. A code segment translates each of the separated first and second constituent voice data into text format and stores the respective translated first and second constituent voice data in a first and second text file 52. A code segment analyzes the first and second text files by applying a predetermined linguistic-based psychological behavioral model thereto 54. The code segment generates either or both of behavioral assessment data and distress assessment data corresponding to each of the analyzed first and second constituent voice data 54.

A code segment is also provided for generating call assessment data 56. The call assessment data is resultant of the comparative analysis of the behavioral assessment data and distress assessment data corresponding to the analyzed first voice data and the behavioral assessment data and distress assessment data corresponding to the analyzed second voice data. A code segment then transmits an output of event data corresponding to at least one identifying indicia (e.g., call type, call time, agent, customer, etc.) 58. This event data is comprised of a call assessment data corresponding to at least one identifying indicia (e.g., a CSR name, a CSR center identifier, a customer, a customer type, a call type, etc.) and at least one predetermined time interval. Now will be described in detail the user interface for accessing and manipulating the event data of an analysis.

In one embodiment of the present invention shown in FIG. 13, the analysis of the constituent voice data includes the steps of: translating constituent voice data to be analyzed into a text format 60 and applying a predetermined linguistic-based psychological behavioral model to the translated constituent voice data. In applying the psychological behavioral model, the translated voice data is mined 62. In this way at least one of a plurality of behavioral signifiers associated with the psychological behavioral model is automatically identified in the translated voice data. When the behavioral signifiers are identified, the behavioral signifiers are automatically associated with at least one of a plurality of personality types 68 associated with the psychological behavioral model 64, 66. By applying appropriate algorithms behavioral assessment data corresponding to the analyzed constituent voice data is generated 55.

The method and system of the present invention is useful in improving the quality of customer interactions with agents and ultimately customer relationships. In use, a customer wishing to engage in a service call, a retention call or a sales call will call into (or be called by) a contact center. When the call enters the contact center it will be routed by appropriate means to a call center agent. As the interaction transpires, the voice data will be recorded as described herein. Either contemporaneously with the interaction, or after the call interaction has concluded, the recorded voice data will be analyzed as described herein. The results of the analysis will generate call assessment data comprised of behavioral assessment data, distress assessment data and phone event data. This data may be subsequently used by a supervisor or trainer to evaluate an agent, or take other remedial action such as call back the customer, etc. Also, graphical and pictorial analysis of the resultant call assessment data (and event data) will be accessible through a portal by a subsequent user (e.g., a supervisor, training instructor or monitor) through a graphical user interface.

A user of the system 1 described above interacts with the system 1 via a unique graphical user interface ("GUI") 400. The GUI 400 enables the user to navigate through the system 1 to obtain desired reports and information regarding the caller interaction events stored in memory. The GUI 400 can be part of a software program residing in whole or in part in a computer 12, or it may reside in whole or in part on a server coupled to a computer 12 via a network connection, such as through the Internet or a local or wide area network (LAN or WAN). Moreover, a wireless connection can be used to link to the network.

In the embodiment shown in FIGS. 14-32, the system 1 is accessed via an Internet connection from a computer. Known browser technology on the computer can be implemented to reach a server hosting the system program. The GUI 400 for the system will appear as Internet web pages on the display of the computer.

As shown in FIG. 14, the GUI 400 initially provides the user with a portal or "Log On" page 402 that provides fields for input of a user name 404 and password 406 to gain access to the system. Additionally, the GUI 400 can direct a user to one or more pages for setting up a user name and password if one does not yet exist.

Referring to FIG. 15, once logged into the system 1, the user can navigate through the program by clicking one of the elements that visually appear as tabs generally on the upper portion of the display screen below any tool bars 408. In the embodiment shown in FIG. 15, the system 1 includes a PROFILES tab 410, a REVIEW tab 412 and a METRICS tab 414. A variety of the other tabs with additional information can also be made available.

The computer program associated with the present invention can be utilized to generate a large variety of reports relating to the recorded call interaction events, the statistical analysis of each event and the analysis of the event from the application of the psychological model. The GUI 400 is configured to facilitate a user's request for specific reports and to visually display the Reports on the user's display.

The REVIEW tab 412 enables the user to locate one or more caller interaction events (a caller interaction event is also herein referred to as a "call") stored in the memory. The REVIEW tab 412 includes visual date fields or links 416, 418 for inputting a "from" and "to" date range, respectively. Clicking on the links 416, 418 will call a pop-up calendar for selecting a date. A drop down menu or input field for entering the desired date can also be used.

The caller interaction events are divided into folders and listed by various categories. The folders can be identified or be sorted by the following event types: upset customer/issue unresolved; upset customer/issued resolved; program dissatisfaction; long hold/silence (e.g., caller is placed on hold for greater than a predetermined time—e.g., 90 seconds—or there is a period of silence greater than a predetermined amount of time—e.g., 30 seconds); early hold (i.e., customer is placed on hold within a predetermined amount of time—e.g., 30 seconds—of initiating a call); no authentication (i.e., the agent does not authorize or verify an account within a predetermined time—e.g., the first three minutes of the call); inappropriate response (e.g., the agent exhibits inappropriate language during the call); absent agent (i.e., incoming calls where the agent does not answer the call); long duration for call type (i.e., calls that are a predetermined percentage over—e.g., 150%—the average duration for a given call type); and transfers (i.e., calls that end in a transfer). The categories include: customers, CSR agents, and customer service events.

The REVIEW tab 412 includes a visual link to a customer folder 420. This includes a list of calls subdivided by customer type. The customer folder 420 may include subfolders for corporate subsidiaries, specific promotional programs, or event types (i.e., upset customer/issue unresolved, etc.).

The REVIEW tab 412 also includes a visual link to call center or CSR agent folders 422. This includes a list of calls divided by call center or CSR agents. The initial breakdown is by location, followed by a list of managers, and then followed by the corresponding list of agents. The REVIEW tab 412 also includes a visual link to a customer service folders 424. This includes a list of calls subdivided by caller events, call center or CSR agent, and other relevant events.

The REVIEW tab 412 also includes a visual SEARCH link 426 to enable the user to search for calls based on a user-defined criteria. This include the date range as discussed above. Additionally, the user can input certain call characteristics or identifying criteria. For example, the user can input a specific call ID number and click the SEARCH link 426. This returns only the desired call regardless of the date of the call. The user could choose an agent from a drop down menu or list of available agents. This returns all calls from the selected agent in the date range specified. The user could also choose a caller (again from a drop down menu or list of available callers). This returns all calls from the selected caller(s) within the date range.

Figure 17:
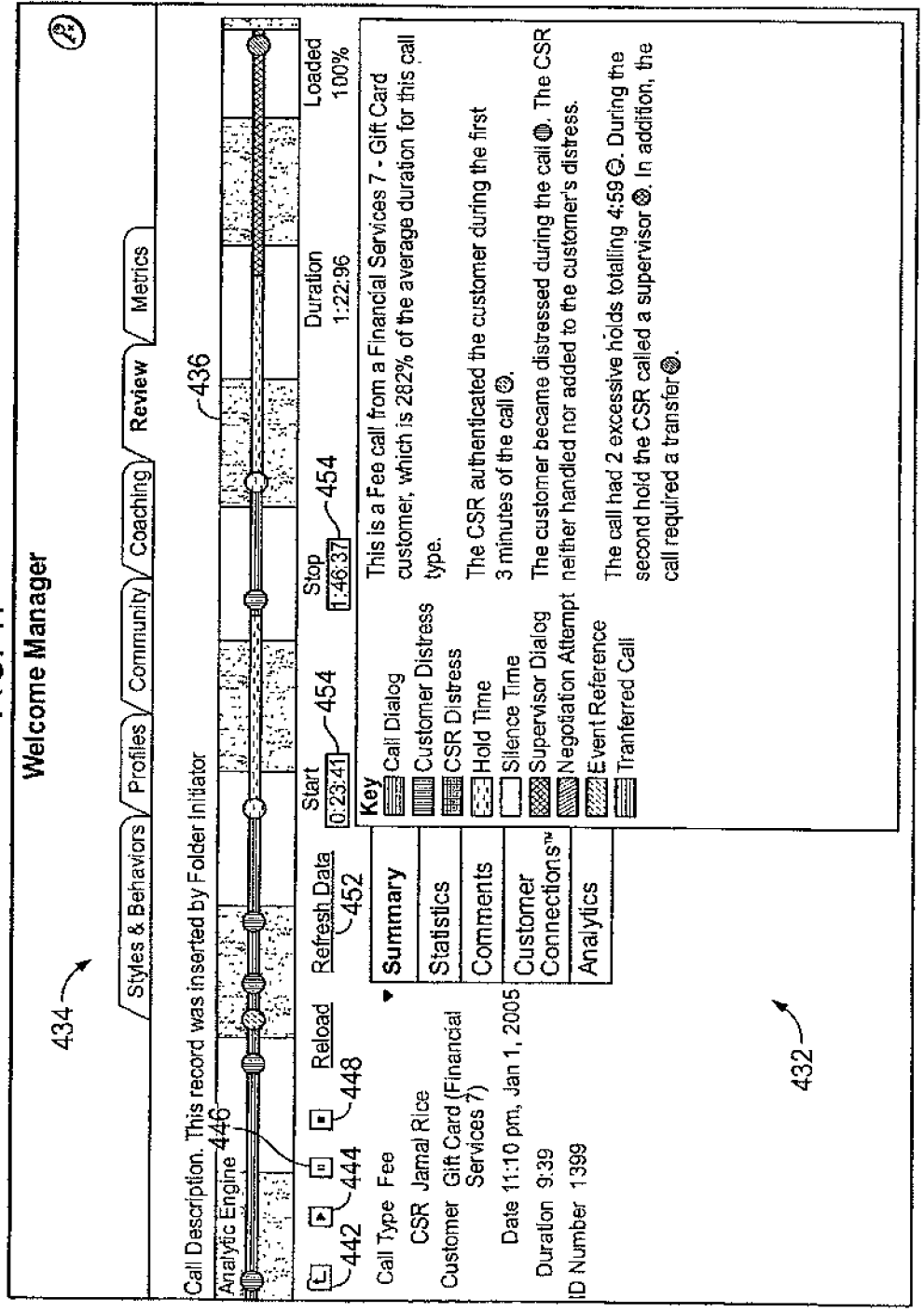

The results from the search are visually depicted as a list of calls 428 as shown in FIG. 16. Clicking on any call 430 in the list 428 links the user to a call page 432 (as shown in FIG. 17) that provides call data and links to an audio file of the call which can be played on speakers connected to the user's computer.

The call page 432 also includes a conversation visual field 434 for displaying a time-based representation of characteristics of the call based on the psychological behavioral model. The call page 432 displays a progress bar 436 that illustrates call events marked with event data shown as, for example, colored points and colored line segments. A key 440 is provided explaining the color-coding.

The call page 432 further includes visual control elements for playing the recorded call. These include: BACK TO CALL LIST 442; PLAY 444; PAUSE 446; STOP 448; RELOAD 450; REFRESH DATA 452 and START/STOP/DURATION 454. The START/STOP/DURATION 454 reports the start, stop and duration of distinct call segments occurring in the call. The distinct call segments occur when there is a transition from a caller led conversation to an agent led conversation—or visa versa—and/or the nature of the discussion shifts to a different topic).

The REVIEW tab 412 also provides a visual statistics link 456 for displaying call statistics as shown in FIG. 18. The statistics can include information such as call duration, average duration for call type, caller talk time, number of holds over predetermined time periods (e.g., 90 seconds), number of silences, customer satisfaction score, etc.

The REVIEW tab 412 also provides a comments link 458. This will provide a supervisor with the ability to document comments for each call that can be used in follow-up discussions with the appropriate agent.

The METRICS tab 414 allows the user to generate and access Reports of caller interaction event information. The METRICS tab 414 includes two folders: a standard Reports folder 460 and an on-demand Reports folder. The standard reports folder 460 includes pre-defined call performance reports generated by the analytics engine for daily, weekly, monthly, quarterly, or annual time intervals. These Reports are organized around two key dimensions: caller satisfaction and agent performance. The on-demand reports folder 462 includes pre-defined call performance reports for any time interval based around two key dimensions: caller and agent.

The GUI 400 facilitates generating summary or detailed Reports as shown in FIG. 19. The user can select a Report time range via a pop-up calendar. For summary Reports, the user can select from: client satisfaction; summary by call type; and non-analyzed calls. For detailed Reports, the user can indicate the type of Report requested and click the Open Reports link 464. Additionally, the user can generate Program Reports. The user selects a client and filters the client by departments or divisions.

A CLIENT SATISFACTION REPORT 466 is shown in FIG. 20. The client Satisfaction Score 468 ranks relative call satisfaction across event filter criteria. The CLIENT SATISFACTION REPORT 466 is also available in pre-defined time intervals (for example, daily, weekly, monthly, quarterly, or annually).

The CLIENT SATISFACTION REPORT 466 includes a number of calls column 470 (total number of calls analyzed for the associated client during the specified reporting interval), an average duration column 472 (total analyzed talk time for all calls analyzed for the associated client divided by the total number of calls analyzed for the client), a greater than (">") 150% duration column 474 (percentage of calls for a client that exceed 150% of the average duration for all calls per call type), a greater than 90 second hold column 476 (percentage of calls for a client where the call center agent places the client on hold for greater than 90 seconds), a greater than 30 second silence column 478 (percentage of calls for a client where there is a period of continuous silence within a call greater than 30 seconds), a customer dissatisfaction column 480 (percentage of calls for a client where the caller exhibits dissatisfaction or distress—these calls are in the dissatisfied caller and upset caller/issue unresolved folders), a program dissatisfaction column 482 (percentage of calls where the caller exhibits dissatisfaction with the program), and a caller satisfaction column 484 (a composite score that represents overall caller satisfaction for all calls for the associated client).

The caller satisfaction column 484 is defined by a weighted percentage of the following criteria as shown in FIG. 21: >150% duration (weight 20%), >90 second hold (10%), >30 second silence (10%), caller distress (20%), and program dissatisfaction (20%). All weighted values are subtracted from a starting point of 100.

The user can generate a summary by CALL TYPE REPORT 486 as shown in FIG. 22. The CALL TYPE REPORTS 486 identify analysis results by call type for the specified interval. The summary by call type Report 486 contains a composite satisfaction score 488 that ranks relative client satisfaction across event filter criteria. The CALL TYPE REPORT 488 includes a call type column 490, as well as the other columns described above.

The user can generate a NON-ANALYZED CALLS REPORT 492 as shown in FIG. 23. The NON-ANALYZED CALLS REPORT 492 provides a summary level report that identifies non-analyzed calls for the specified time interval.

As shown in FIG. 24, the user can generate a DETAIL LEVEL REPORT 494. The detail level Report 494 identifies analysis results by client and call type for the specified time interval. The DETAIL LEVEL REPORT 494 contains a composite satisfaction score 496 that ranks relative client satisfaction for each call type across event filter criteria.

A PROGRAM REPORT 498 is shown in FIG. 25. This is a detail level report that identifies analysis results by client departments or divisions for the specified time interval. THE PROGRAM REPORT 498 contains a composite satisfaction score 500 that ranks relative client satisfaction for each call type across event filter criteria.

The user can also generate a number of CALL CENTER or CSR AGENT REPORTS. These include the following summary reports: corporate summary by location; CSR agent performance; and non-analyzed calls. Additionally, the user can generate team reports. The team Reports can be broken down by location, team or agent.

A CORPORATE SUMMARY BY LOCATION REPORT 502 is shown in FIG. 26. This detail level Report 502 identifies analysis results by location for the specified time interval, and contains a composite score that ranks relative client performance for each call type across event filter criteria. The CORPORATE SUMMARY BY LOCATION REPORT 502 includes a location column 504 (this identifies the call center location that received the call), a number of calls column 506 (total number of calls received by the associated call center location during the specified reporting interval, an average duration column 508 (total analyzed talk time for all calls analyzed for the associated CSR agent divided by the total number of calls analyzed for the agent), a greater than 150% duration column 510 (percentage of calls for a CSR agent that exceed 150% of the average duration for all calls, a greater than 90 second hold column 512 (percentage of calls for a CSR agent where the CSR places the caller on hold for greater than 90 seconds), a greater than 30 second silence column 514 (percentage of calls for a CSR agent where there is a period of continuous silence within a call greater than 30 seconds), a call transfer column 516 (percentage of calls for a CSR agent that result in the caller being transferred), an inappropriate response column 518 (percentage of calls where the CSR agent exhibits inappropriate behavior or language), an appropriate response column 520 (percentage of calls where the CSR agent exhibits appropriate behavior or language that result in the dissipation of caller distress—these calls can be found in the upset caller/issue resolved folder), a no authentication column 522 (percentage of calls where the CSR agent does not authenticate the caller's identity to prevent fraud), and a score column 524 (a composite score that represents overall call center performance for all calls in the associated call center location.)

The values 526 in the score column 524 are based on the weighted criteria shown in FIG. 27. All weighted values are subtracted from a starting point of 100 except for "appropriate response," which is an additive value.

A CSR PERFORMANCE REPORT 528 is shown in FIG. 28. This is a detail level report that identifies analysis results by CSR for the specified time interval. This Report 528 contains a composite score that ranks relative CSR performance for each call type across event filter criteria.

FIG. 29 shows a NON-ANALYZED CALLS REPORT 530. This is a detail level report that identifies analysis results by non-analyzed CSR calls for a specified time interval.

A LOCATION BY TEAM REPORT 532 is shown in FIG. 30. This is a summary level report that identifies analysis results by location and team for the specified time interval. This Report 532 contains a composite score that ranks relative CSR performance across event filter criteria by team.

FIG. 31 shows a TEAM BY AGENT REPORT 534. This is a summary level report that identifies analysis results by team and agent for the specified time interval. These Reports 534 contain a composite performance score that ranks relative CSR performance across event filter criteria by agent.

FIG. 32 shows a CSR BY CALL TYPE REPORT 536. This is a detail level report that identifies analysis results by CSR and call type for the specified time interval. These Reports 536 contain a composite performance score that ranks relative CSR performance across event filter criteria by call type.

While the specific embodiments have been illustrated and described, numerous modifications come to mind without significantly departing from the spirit of the invention, and the scope of protection is only limited by the scope of the accompanying Claims.

What is claimed is:

1. A non-transitory, computer readable medium that controls an executable computer readable program code embodied therein, the executable computer readable program code for implementing a method of analyzing electronic communication data and generating behavioral assessment data therefrom, which method comprises:

receiving, by a control processor, an electronic communication in text form from a communicant;

analyzing the text of the electronic communication by mining the text of the electronic communication and applying a predetermined linguistic-based psychological behavioral model to the text of the electronic communication; and generating behavioral assessment data including a personality type corresponding to the analyzed text of the electronic communication.

2. The non-transitory, computer readable medium of claim 1, wherein the electronic communication comprises at least one of telephone calls, facsimile transmissions, e-mails, web interactions, voice over IP ("VoIP") and video.

3. The non-transitory, computer readable medium of claim 1, wherein the electronic communication comprises at least one of electronic mail data and electronic social media data.

4. The non-transitory, computer readable medium of claim 1, wherein the electronic communication comprises at least one of a digital recording of a telephone call, a facsimile transmission, an e-mail, a web interaction, voice over IP ("VoIP"), and a digital video.

5. The non-transitory, computer readable medium of claim 4, wherein the e-mail comprises digital electronic mail data or the web interaction comprises electronic social media data.

6. The non-transitory, computer readable medium of claim 1, which further comprises separating the electronic communication into at least first constituent text data and second constituent text data, the first constituent text data being generated by the communicant, wherein the analyzing comprises analyzing of the separated first and second constituent text data by mining the separated one of the first and second constituent text data and applying a predetermined linguistic-based psychological behavioral model to the one of the separated first and second constituent text data, and wherein the generating comprises generating behavioral assessment data including personality type corresponding to the analyzed one of the separated first and second constituent text data based on the step of analyzing one of the first and second constituent text data.

7. The non-transitory, computer readable medium of claim 6, wherein the separating the electronic communication into at least first constituent text data and second constituent text data further comprises:
   identifying a communication protocol associated with an electronic communication;
   recording the electronic communication to a first electronic data file comprising a first and second audio track, the first constituent voice data being automatically recorded on the first audio track based on the identified communication protocol, and the second constituent voice data being automatically recorded on the second audio track based on the identified communication protocol; and
   separating at least one of the first and second constituent data recorded on the corresponding first and second track from the first electronic data file.

8. The non-transitory computer readable medium of claim 7, which further comprises a non-transitory executable computer readable program code for implementing the step of storing the behavioral assessment data, wherein the behavioral data corresponds to at least one identifying indicia and is made available for subsequent analysis.

9. The non-transitory computer readable medium of claim 7, which further comprises non-transitory executable computer readable program code for implementing a step of generating event data corresponding to a least one identifying indicia and time interval, the event data comprising at least one of behavioral assessment data and distress assessment data.

10. The non-transitory computer readable medium of claim 7, which further comprises non-transitory executable computer readable program code for implementing the steps of:
   generating a graphical user interface for displaying a first field for enabling identification of customer interaction event information on a display, the customer interaction event information including analysis data based on the psychological behavioral model applied to the analyzed constituent data of each customer interaction event;
   receiving input from a user for identifying at least a first customer interaction event; and,
   displaying the customer interaction event information for the first customer interaction event.

11. The non-transitory, computer readable medium of claim 1, wherein the generating behavioral assessment data comprises updating existing behavioral assessment data based on analysis of a recent text by the communicant.

12. The non-transitory, computer readable medium of claim 1, wherein the generating includes providing a visual display showing the results of the psychological behavioral model that was applied to the electronic communication.

13. The non-transitory, computer readable medium of claim 1, wherein the behavioral assessment. data includes a plurality of personality types corresponding to the analyzed text of the electronic communication from the communicant.

14. The non-transitory, computer readable medium of claim 1, wherein the personality type comprises an arrangement of all personality types in a plurality of tiers.

15. The non-transitory, computer readable medium of claim 1, which further comprises a non-transitory executable computer readable program code for implementing the steps of:
   separating the electronic communication into at least first constituent text data and second constituent text data, the first constituent text data being generated by the communicant;
   applying a predetermined linguistic-based psychological behavioral model to both the first and second constituent text data; and
   generating behavioral assessment data including personality type for both the first and second constituent text data.

16. The non-transitory, computer readable medium of claim 15, which further comprises a non-transitory executable computer readable program code that, when executed, compares the behavioral assessment data generated from the first and second constituent text data.

17. A method for analyzing an electronic communication for behavioral assessment data, the method comprising:
   receiving, by a control processor, a single electronic communication in text form from a communicant;
   analyzing the text of the electronic communication by mining the text of the electronic communication and applying a predetermined linguistic-based psychological behavioral model to the text of the electronic communication; and
   generating behavioral assessment data including a personality type corresponding to the analyzed text of the electronic communication.

18. The method of claim 17, which further comprises selecting the electronic communication to include at least one of a telephone call, facsimile transmission, e-mail, web interaction, voice over IP ("VoIP") or video.

19. The method of claim 17, which further comprises selecting the electronic communication to include at least one of electronic mail data or electronic social media data.

20. The method of claim 17, which further comprises selecting the electronic communication to include at least one of a digital recording of a telephone call, a facsimile transmission, an e-mail, a web interaction, voice over IP ("VoIP"), or a digital video.

21. The method of claim 20, which further comprises selecting the e-mail to include digital electronic mail data or the web interaction to include electronic interaction data.

22. The method of claim 17, wherein the generating includes providing a report comprising a graphical representation including the behavioral assessment data.

23. The method of claim 17, which further comprises adapting the predetermined linguistic-based psychological behavioral model to assess distress levels in a communication, the method further comprising generating distress assessment data corresponding to the analyzed text.

24. The method of claim 17, which further comprises generating event data corresponding to at least one identifying indicia and time interval, the event data being selected to comprise at least one of behavioral assessment data and distress assessment data.

25. The method of claim 17, which further comprises:

separating the electronic communication into at least first and second constituent text data, the first constituent text data being generated by the communicant; and analyzing one of the separated first and second constituent text data by mining the separated one of the first and second constituent text data and applying a predetermined linguistic-based psychological behavioral model to the one of the separated first and second constituent text data, wherein the generating behavioral assessment data including a personality type corresponding to the analyzed text is additionally corresponding to one of the separated first and second constituent text data based on the step of analyzing one of the first and second constituent text data.

26. The method of claim 15, which further comprises:

separating the electronic communication into at least first constituent text data and second constituent text data, the first constituent text data being generated by the communicant;

applying a predetermined linguistic-based psychological behavioral model to both the first and second constituent text data;

generating behavioral assessment data including personality type for both the first and second constituent text data; and comparing the behavioral assessment data generated from the first and second constituent text data.

\* \* \* \* \*